(12) United States Patent
Gutgsell et al.

(10) Patent No.: US 6,792,877 B2
(45) Date of Patent: *Sep. 21, 2004

(54) ELECTRICAL RACEWAY ASSEMBLY

(75) Inventors: David R. Gutgsell, Jasper, IN (US); Scott Schwinghammer, Jasper, IN (US); Burton L. Siegal, Skokie, IL (US)

(73) Assignee: Ditto Sales, Inc., Jasper, IN (US)

( * ) Notice: Subject to any disclaimer, the term of this patent is extended or adjusted under 35 U.S.C. 154(b) by 392 days.

This patent is subject to a terminal disclaimer.

(21) Appl. No.: 09/843,216

(22) Filed: Apr. 26, 2001

(65) Prior Publication Data

US 2003/0127027 A1 Jul. 10, 2003

Related U.S. Application Data

(63) Continuation of application No. 09/088,817, filed on Jun. 1, 1998, now Pat. No. 6,244,193, which is a continuation-in-part of application No. 09/082,128, filed on May 20, 1998, now Pat. No. 6,137,057.

(51) Int. Cl.[7] ................................................ H02B 1/20
(52) U.S. Cl. ................................ 108/50.02; 312/223.6
(58) Field of Search .......................... 312/223.3, 223.6, 312/154, 156, 140.4; 174/48; 108/26, 50.01, 50.02; 403/374.1, 374.5, 110, 409.1

(56) References Cited

U.S. PATENT DOCUMENTS

| | | | |
|---|---|---|---|
| 3,834,780 A | 9/1974 | McClellan et al. | |
| 4,017,137 A | 4/1977 | Parks | |
| 4,094,561 A | * 6/1978 | Wolff et al. | 312/223.6 |
| 4,277,123 A | 7/1981 | Haworth et al. | |
| 4,370,008 A | 1/1983 | Haworth et al. | |
| 4,372,629 A | * 2/1983 | Propst et al. | 312/223.6 |
| 4,445,729 A | 5/1984 | Scheerhorn | |
| 4,802,595 A | * 2/1989 | Northington | 211/88.02 |
| 4,886,326 A | 12/1989 | Kuzyk | |
| 5,024,614 A | 6/1991 | Dola et al. | |
| 5,135,284 A | 8/1992 | Crum | |
| 5,231,562 A | 7/1993 | Pierce et al. | |
| 5,249,879 A | * 10/1993 | Zoor | 403/374.5 |
| 5,451,101 A | 9/1995 | Ellison et al. | |
| 5,632,166 A | 5/1997 | Wiersma | |
| 5,704,175 A | 1/1998 | Lewis | |
| 5,971,509 A | * 10/1999 | Deimen et al. | 312/223.6 |

* cited by examiner

Primary Examiner—Janet M. Wilkens
(74) Attorney, Agent, or Firm—Maginot, Moore & Beck

(57) ABSTRACT

An electrical raceway assembly for use with a table-top structure. The raceway assembly includes an elongated raceway and a locking element. The locking element includes a first end detachably engaged to the raceway, and an opposite second end having a locking lever movable between a locked position for quickly engaging the raceway to the structure and a released position for quickly releasing the raceway from the structure. The elongated raceway has a length, a transverse base and a pair of opposite upstanding sidewalls extending along the length to define at least one open channel configured for retaining electrical wires. The raceway is engageable to the table-top structure in either a first position, wherein the raceway extends above the upper surface, or a second position, wherein the raceway extends beneath the lower surface. The raceway is further engageable in either a forward facing orientation or a reversed orientation.

6 Claims, 27 Drawing Sheets

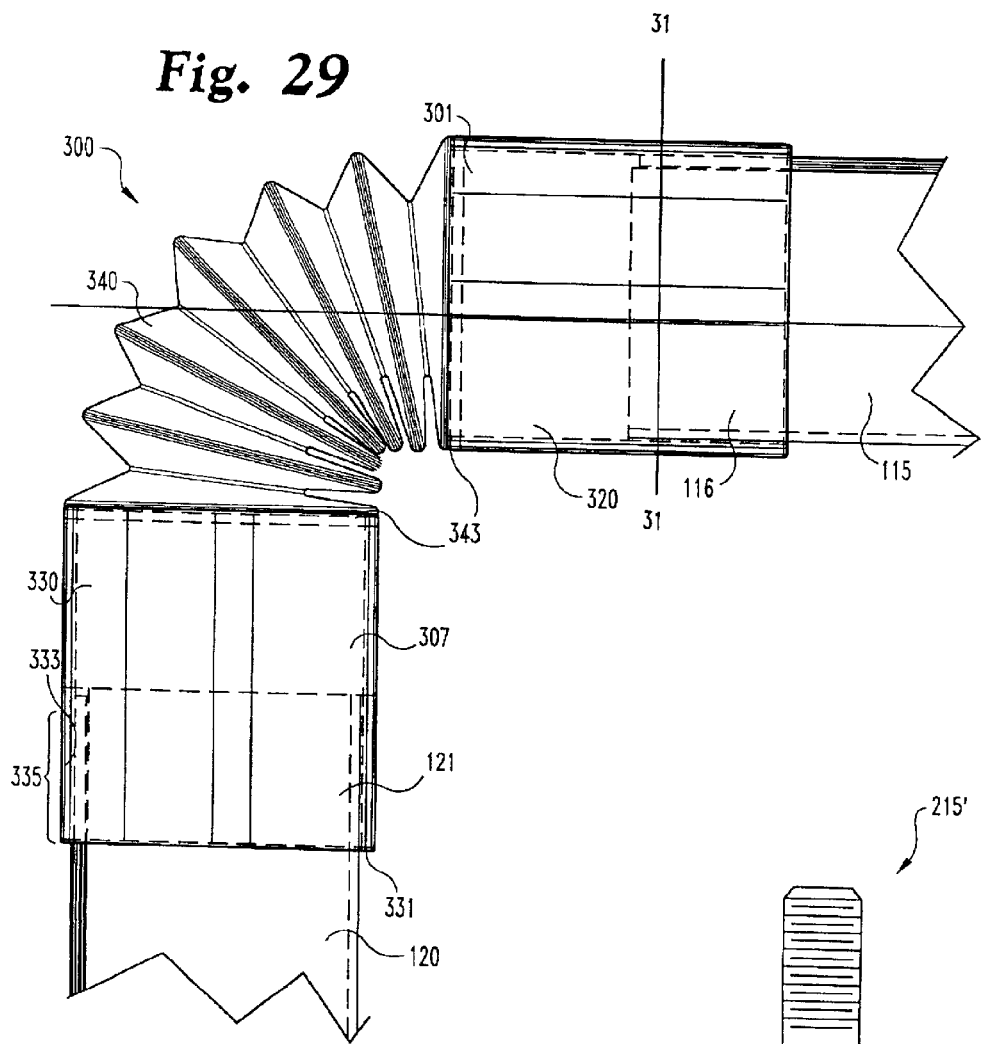

ELECTRICAL RACEWAY ASSEMBLY

This application is a continuation of application Ser. No. 09/088,817, filed Jun. 1, 1998, now U.S. Pat. No. 6,244,193, which is a continuation-in-part of application Ser. No. 09/082,128, filed May 20, 1998, now U.S. Pat. No. 6,137,057.

FIELD OF THE INVENTION

The present invention relates to the electrification of structures, particularly office furniture and partitions, dividers and panels used to form office cubicles. Specifically, the invention concerns electrical raceway systems and devices to increase the usefulness and appearance of the systems.

BACKGROUND OF THE INVENTION

As the cost of doing business has increased due to increases in costs of personnel, insurance, office space and the like, a trend for downsizing has developed. This trend along with the expanding presence of small businesses has created a pressure for economy in the workplace. Part of this economy is that a space may be required to fulfill more than one role. At the same time, an awareness of the effects of office aesthetics on morale and productivity has created a desire for pleasant and efficient workspaces. To meet these needs, attractive yet portable training, conference and office furniture is marketed by Versteel, P.O. Box 850, Jasper, Ind. 47547 (800876-2120). Also, in many cases, open office plans must be divided into individual offices or workstations. Many arrangements are available to divide an open office space, including partition panels, systems furniture, and modular furniture.

Such workstations typically require specific features for maximum functionality: power supply, communication ports and keyboard or other support tools. However, in open office space, work structures may be placed in locations that are not easily accessible to the office space electrical and communication ports. Therefore, one challenge with providing power supply and communication access to the desk top of each workstation is wire management. Improper wire management can lead to interruptions in service, workplace hazards and poor aesthetics.

There is a growing need for improved components and systems for accommodating the distribution of electrical power along or in structures. Examples of electrical systems in office furniture panels and modular wall units are disclosed in U.S. Pat. Nos. 4,370,008, 5,231,562 and 5,451,101. Such systems include raceway enclosures for guiding electrical and communication wires from wall outlets to workstation structures. The raceway system facilitates the extension of both electrical and communication cables along the system in an efficient yet hidden manner, while permitting desired utilization of these cables at selected locations.

In spite of the benefits of such raceway systems, a need has remained for systems that improve the usability, flexibility, dependability, appearance and convenience of such raceway systems, particularly when used with tables or desks.

SUMMARY OF THE INVENTION

Briefly describing one aspect of the invention, a workspace structure assembly is provided. The assembly includes a table top structure having an upper and lower surface and supported on at least one leg. An elongated raceway is engageable to the structure and has a length, a transverse base and a pair of opposite upstanding sidewalls extending along the length to define at least one channel configured for retaining electrical wires. A locking element is provided to securely and detachably engage the raceway to an edge of the structure.

In one embodiment, the locking element includes an attachment element, a stud, a core and a locking lever. The stud defines a first axis along the length of the stud and has a threaded first end, an opposite second end and a shoulder between the first and second ends. The first end is insertable through an opening defined in the attachment element to engage a threaded hole in the surface of the structure. The core has a rounded outer surface and defines a thru-hole for receiving the second end of the stud. Means are provided for fixing the second end within the thru-hole. The core defines a second axis perpendicular to the first axis.

The locking lever includes a handle portion and a rounded camming portion. The camming portion defines a chamber for rotatably housing the core and a wall defining a groove in communication with the chamber for receiving the second end of the stud. The wall defines a contoured camming surface surrounding one end of the groove. The locking lever is rotatable about the second axis of the core from a first released position to a second locked position with the camming surface bearing against the shoulder to securely engage the raceway to the structure.

In another embodiment, a boot is provided for bridging a pair of electrical raceways. The boot includes an elongated tubular member having a semi-U-shaped cross-section. A pair of facing walls and a third wall connecting the face walls define a tunnel along a length of the member. A tunnel mouth extends along the length of the member in communication with the tunnel.

The member also includes a first end, a second end and a flexible midsection. The first end defines a first opening in communication with the tunnel. The first end has an inner surface and an outer surface and a first gripping member for gripping an end of the raceway. A second opposite end defines a second opening in communication with the tunnel, an inner surface, and outer surface and a second gripping member for gripping an end of the second raceway. A relatively more flexible midsection is connected between the first and second ends, which is bendible to assume various configurations. In one embodiment, the midsection includes multiple corrugations. In other embodiments, The gripping members include attachment projections defined on the inner surface of the first and second ends, which are configured to engage recesses defined in the raceways.

In another specific embodiment, a boot assembly is provided that includes a pair of boots for bridging a pair of raceways. Each boot includes a flexible section having a first end and an opposite end and a gripping portion connected to the first end. A flange inwardly projects from the inner surface of the opposite end of the boot. The boot assembly also includes connecting means for connecting the opposite ends of the boots. In one embodiment, the connecting means includes a U-shaped clip for maintaining the flanges in pressing engagement.

The invention also provides decorative plates engageable to the exterior surface of the raceway. The exterior surface of the raceway defines at least one elongate tongue and groove along the length. The tongue is spaced from the exterior surface and the groove is formed between the tongue and the exterior surface. The plates include at least one elongate rib extending along the length of the plate. The rib includes a projection receivable within the groove in cooperative interlocking engagement. In a specific embodiment, a second tongue and groove is adjacent the first tongue and groove and is contiguous with the first groove to form a substantially C-shaped cross-section. In other embodiments, the rib includes a second projection extending oppositely from the first projection so that the rib has a T-shaped cross-section.

In one embodiment, a cover is attachable to the raceway to occlude a portion of the channel. The cover includes an elongated face plate having an interior surface and an exterior surface. The face plate has a first portion and an opposite second portion, each portion extending along a length of the face plate. Attachment means are provided for attaching the first and second portions of the face plate to each of the opposite upstanding sidewalls with the interior surface facing the channel.

A flange extends from one of the portions of the cover plate and occludes an area behind the flange when the cover is attached to the raceway. The flange is relatively more flexible than the other elements of the cover and elastically deformable to allow access to the area. In some embodiments, the flange has a lower durometer than the other elements of the cover, such as the face plate or attachment means. In certain embodiments, the flange is integral with the face plate. In other embodiments the flange is adjacent the second portion and the face plate and is recessed to the face plate.

In another embodiment, one of the side walls of the raceway terminates in a lip, which includes a rounded surface having a radius. The attachment means of the cover includes a groove defined in the first portion that is configured for snap fit engagement with the lip. In some embodiments, a second of the side walls of the raceway terminates in an elongated attachment receptacle and the attachment means of the cover includes a rounded edge of the second portion that is receivable within the attachment receptacle. The rounded edge is configured for snap fit engagement within the receptacle. In specific embodiments the attachment receptacle defines a curved interior portion having an internal radius slightly larger than the radius of the rounded edge for mating with the rounded edge. In another aspect of the invention, the attachment means includes a hinge feature. The rounded edge of the second portion is rotatingly receivable within the attachment receptacle so that the cover is rotatable, about a longitudinal axis of the attachment receptacle, between an open position in which a portion of a channel of the raceway is exposed and a closed position in which the first portion is engaged to the raceway.

Accordingly, it is one object of the invention to provide improved electrical raceway systems for work spaces. These and other objects, advantages and features are accomplished according to the devices and assemblies of the present invention.

DESCRIPTION OF THE FIGURES

FIG. 28 is a side elevational view of another embodiment of a stud of this invention.

FIG. 29 is a side elevational view of a boot raceway assembly of this invention engaged to a pair of raceways.

DESCRIPTION OF THE PREFERRED EMBODIMENTS

Figure 1:
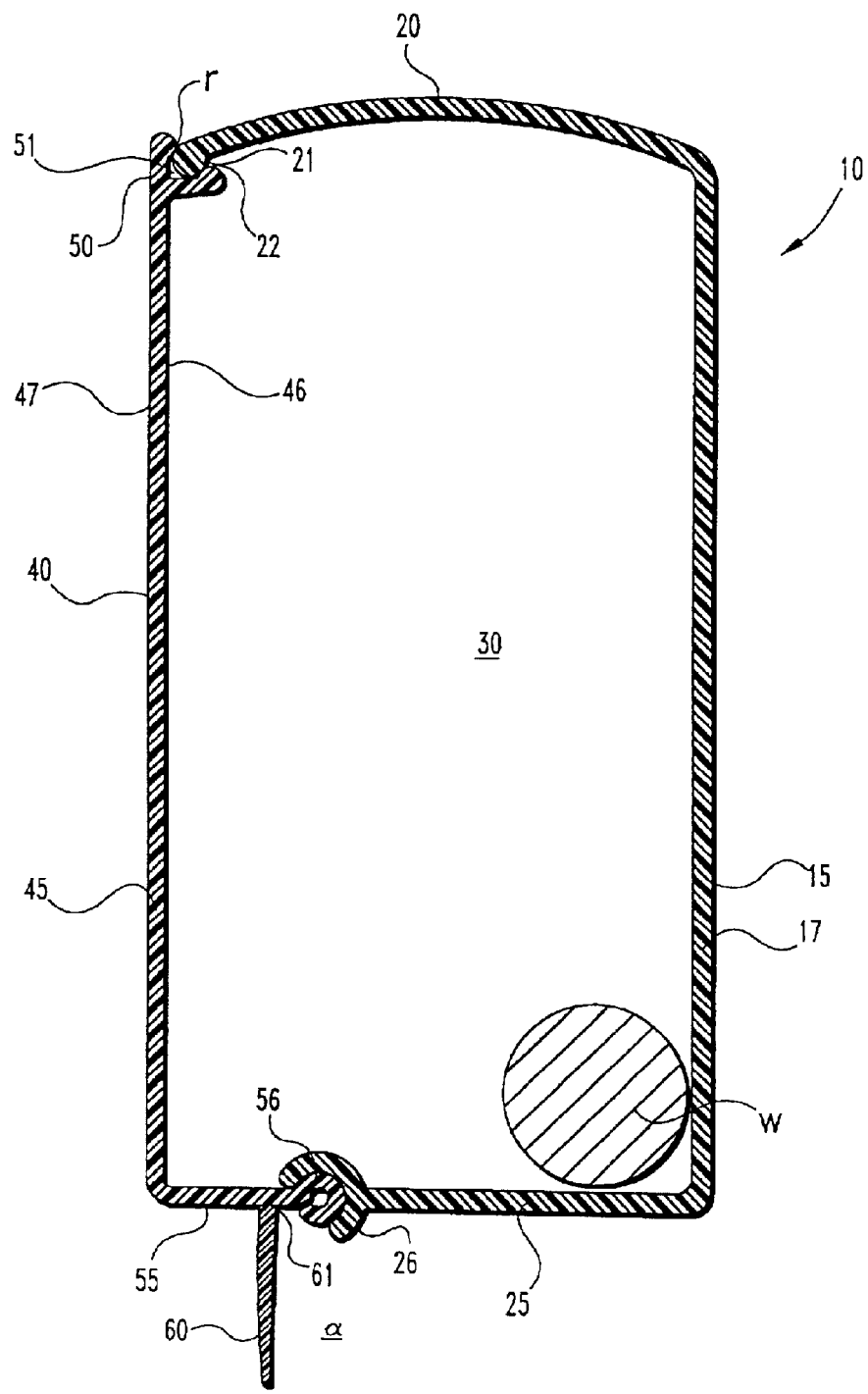
FIG. 1 is side sectional view of an electrical raceway assembly according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

The present invention provides electrical raceway systems and devices for raceways that enhance the functionality and aesthetics of workspaces. The locking elements provide instant, secure installation of raceways to desks, tables and the like. The locking elements allow quick release yet deter theft. The boots provide convenient bridging for wires between adjacent structures. Because the boots are open-sided, they can be installed and removed without disturbing the wires. The boots engage the raceways in a unique way that allows the use of a more flexible so that the boot is bendible to accommodate angles between the raceways. The more flexible midsection allows angles up to about 90°. The boots can also be modified so that they may be joined together to accommodate a greater distance between the raceways. The invention also provides covers for enclosing wires and cables within the raceway channel. The covers are engageable to the raceways in a snap fit engagement that provides secure placement of the cover and allows removal if access to the entire raceway is required. The covers are provided with a pliable flange that occludes an area behind the cover yet allows convenient access to the area for storing electrical cords and the like. Also provided are plates for covering the outside surface of the raceways. The plates have a decorative external surface and an internal surface engageable to the raceway in both right side up and upside down positions. The result of all of these devices is a modular, powered work station that is efficient, streamlined and safe from the hazards of loose wires.

An electrical raceway assembly 10 for attachment to a structure in accordance with a preferred embodiment of the present invention is depicted in FIGS. 1–5. The system 10 includes an elongated raceway 15 engageable to a structure (not shown), such as a desk, table, wall, panel or the like. The raceway 15 has a length L, which preferably extends along a length of the structure to provide power or communication ports at various locations along the structure. The raceway 15 includes a transverse base wall 17 and a pair of opposite upstanding sidewalls 20, 25 extending along the length L of the raceway 15. The walls 17, 20, 25 define a channel 30 configured for retaining and guiding electrical and communication wires W along the length L of the raceway 15. In the embodiment shown in FIG. 1, the channel 30 is U-shaped.

The raceway assembly 10 also includes a cover 40 attachable to the raceway 15 to occlude at least a portion of the channel 30 to shield or protect the contents of the raceway 15 and provide a pleasing appearance to the assembly 10. The cover 40 includes an elongated face plate 45 having an interior surface 46 and an exterior surface 47. The cover face plate 45 also has a first portion 50 and an opposite second portion 55. Each of the portions 50, 55 extend along a length l of the face plate 45. The length l of the face plate 45 may be equal or substantially equal to the length L of the raceway 15 to protect the enclosed wires W and provide a streamlined and aesthetically pleasing appearance to the structure. In some applications it may be desirable to provide several covers 40 for a raceway 15 if the raceway 15 is too long for a single cover 40 to be manageable and convenient.

Attachment means are also provided for attaching the cover 40 to the raceway 15. Preferably, the first and second portions 50, 55 of the face plate 45 are attachable to each of the opposite upstanding sidewalls 20, 25 so that the interior surface 46 faces the channel 30. The cover 40 is preferably configured for snap fit engagement with the raceway 15. For example, as shown in FIG. 1, one of the sidewalls 20 terminates in a lip 21. The lip 21 includes a rounded surface 22 having a radius $r_l$. The lip 21 is configured for mating engagement with attachment means on the first portion 50. In the embodiment shown in FIGS. 1 and 3, the attachment means includes a groove 51 defined in the first portion 50. The groove 51 is configured for snap fit engagement with the lip 21. In one specific embodiment, the attachment means includes an arm 52 that extends along the length l of the cover 40 and along with the first portion 50 defines the groove 51. In preferred embodiments, the first portion 50 and the arm 52 each terminate in a rounded edge 51a, 52a, respectively to facilitate engagement of the lip 21.

Figure 3:
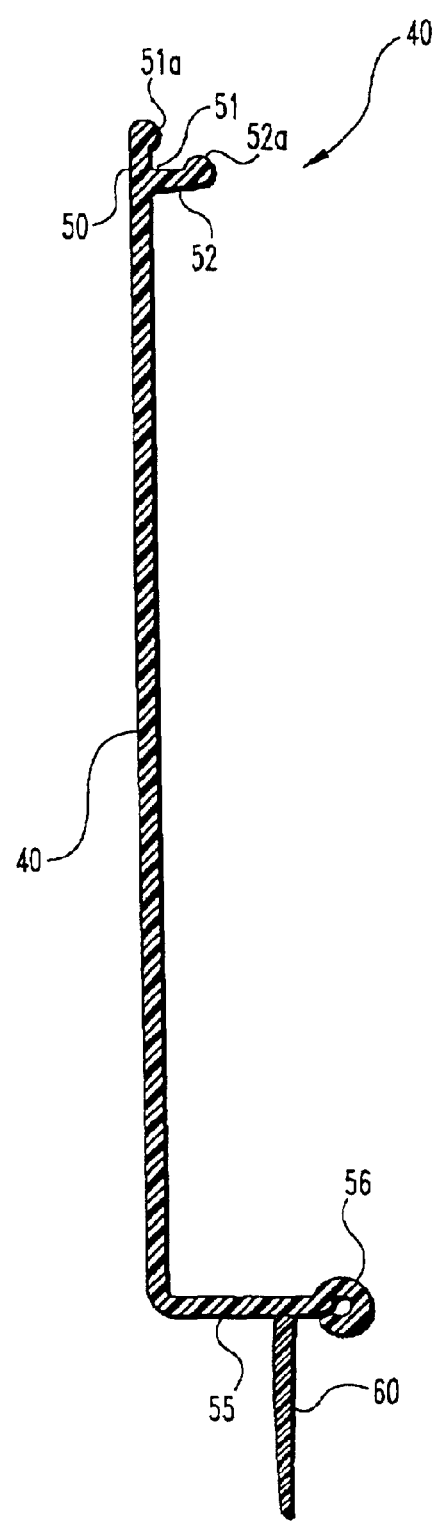
FIG. 3 is a side elevational view of a cover for an electrical raceway according to one embodiment of the present invention.
Figure 4:
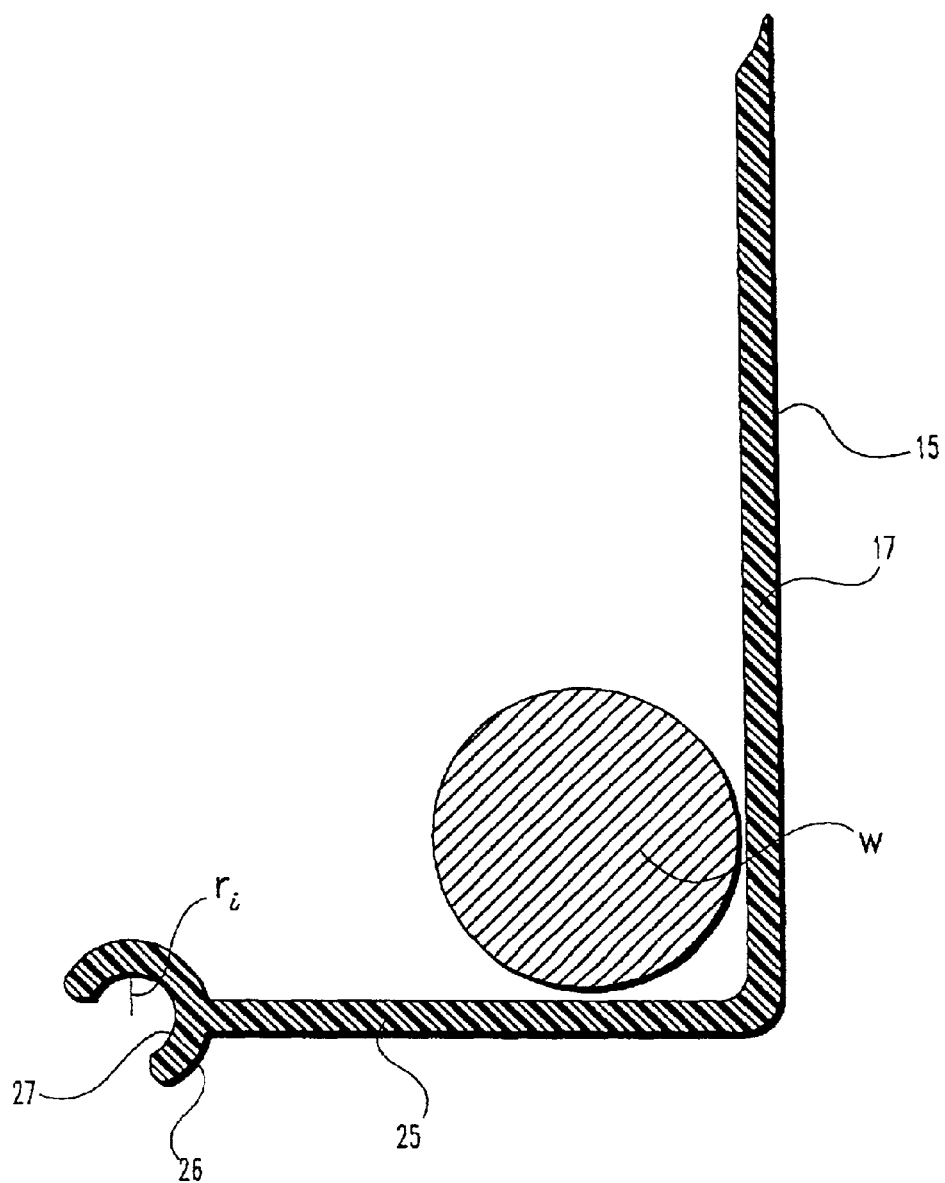
FIG. 4 is a partial side sectional view of an electrical raceway.
Figure 5:
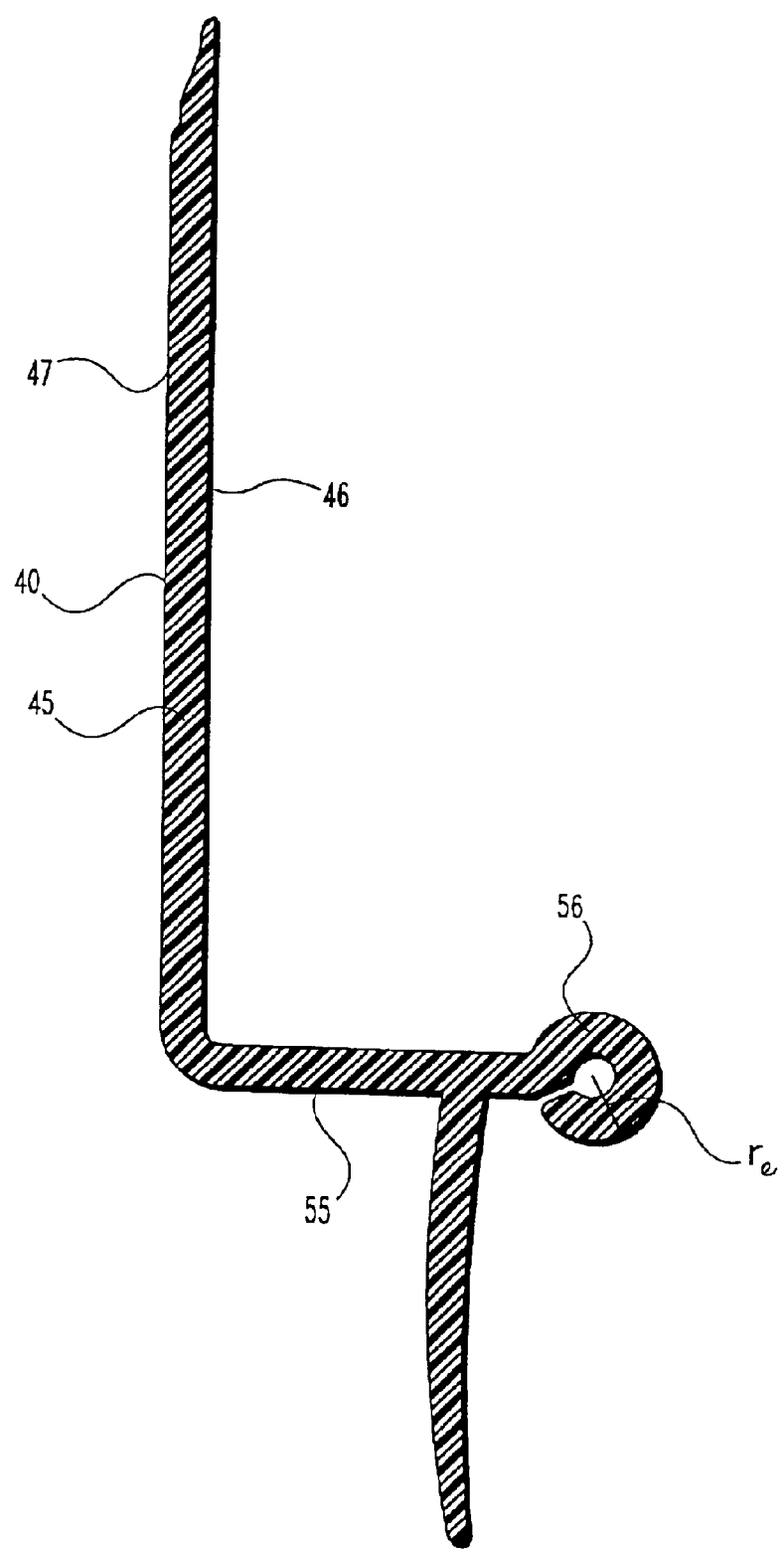
FIG. 5 is a partial side sectional view of a cover for an electrical raceway.

In the embodiment shown in FIGS. 1 and 3, the other side wall 20 of the raceway 15 terminates in an elongated attachment receptacle 26 and the attachment means of the cover 40 includes a rounded edge 56 of the second portion 55. In the particular embodiment shown in FIGS. 1 and 3, the wall 57 of the second portion 55 is curled to form the rounded edge 56. The edge 56 is receivable within the attachment receptacle 26 and is configured for snap fit engagement within the receptacle 26. Preferably, the attachment receptacle 26 defines a curved interior portion 27 having an internal radius $r_i$ slightly larger than the radius $r_e$ of the rounded edge 56 of the second portion 55 for mating with the rounded edge 56 as depicted in FIGS. 4 and 5.

Figure 6:
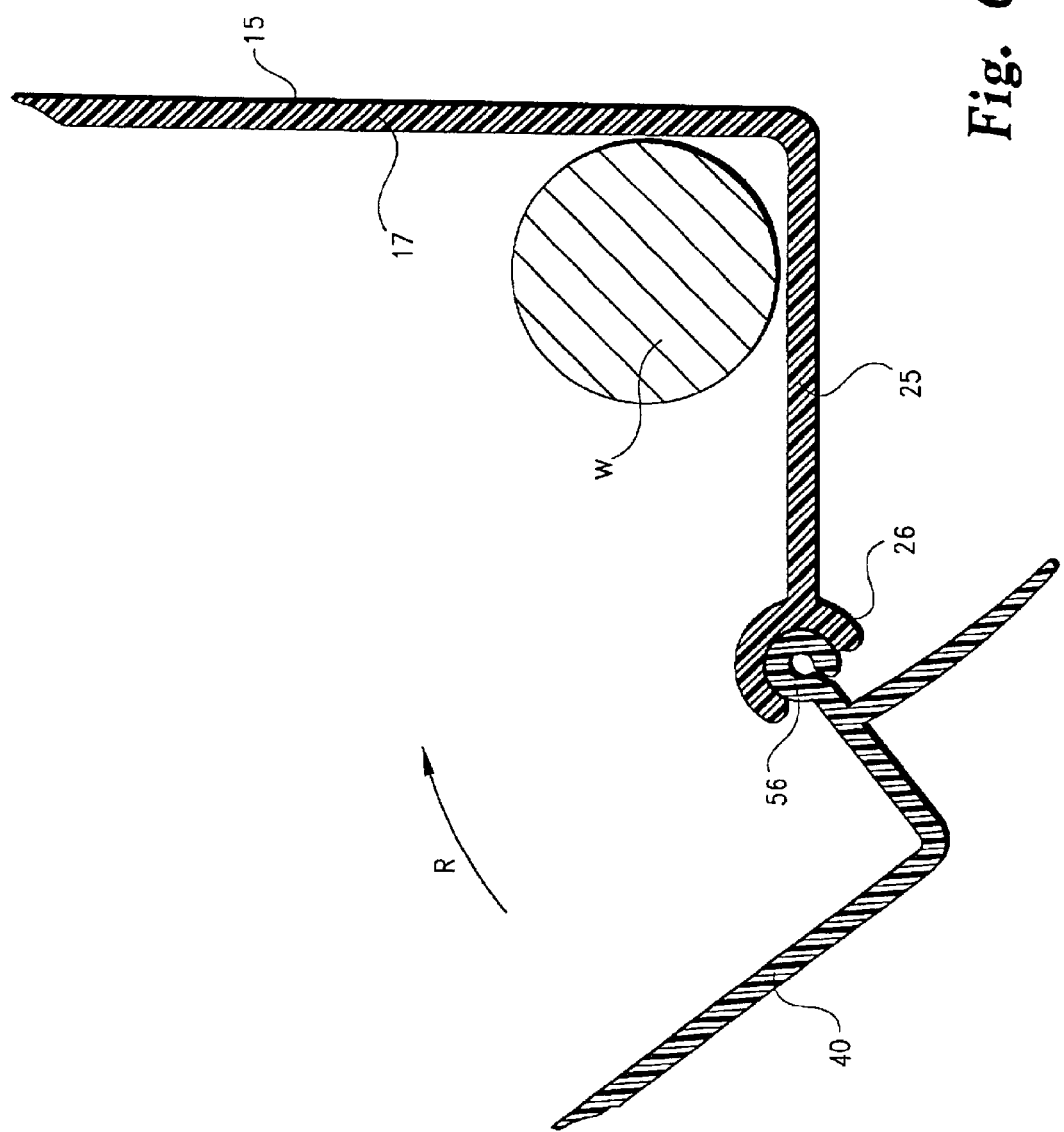
FIG. 6 is a partial side sectional view of an electrical raceway assembly according to one embodiment of the present invention.

Preferably, the rounded edge 56 is rotatingly receivable within the attachment receptacle 26 to facilitate snap fit engagement of the cover 40 to the raceway 15. In operation, the second portion 55 is first engaged to the raceway 15 at an angle that facilitates inserting the rounded edge 56 into the attachment receptacle 26 as shown in FIG. 6. The cover 40 is then rotated along the longitudinal axis $A_r$ (FIG. 2) of the receptacle 26 in the direction of arrow R until the groove 51 of the first portion 50 contacts the lip 21 of the side wall 20 and the lip 21 is forced into engagement with the receptacle 26 as shown in FIG. 1. The raceway 15 can be conveniently accessed without completely disengaging the cover 40 from the raceway 15. The lip 21 is removed from the receptacle 26 and then the cover 40 rotated in a direction opposite to direction of arrow R. After access is completed, cover 40 is closed as described.

A flange 60 extends from an end of the cover 40 and along the length l of the cover 40. The flange 60 provides a pass through for excess cord stored in the area a behind the flange 60 to provide a neat and pleasing work space. In the embodiment of FIG. 3, the flange 60 extends from and is adjacent to the second portion 55 of the cover 40.

Referring again to FIG. 1, the flange 60 is preferably integral with the face plate 45. In some embodiments, the flange 60 is recessed from the face plate 45. The flange 60 occludes an area a behind the flange 60 when the cover 40 is attached to the raceway 15. The flange 60 is relatively more flexible or pliable than other elements of the cover 40, which must be sufficiently rigid to prevent inadvertent detachment from the raceway 15. The flange 60 is elastically deformable to allow convenient access to the area a for storage of wires on the surface of the structure. That is, upon a pulling or pushing pressure, the flange 60 is deformable from its original shape shown in FIG. 1 to a deformed shape that exposes area a. The flange 60 than returns to its original, undeformed state when the deformation force is removed. The relative difference in rigidity allows the flange 60 to bend relative to other stiffer portions of the cover 40 so that the flange 60 is deformable while the cover 40 remains stationary and engaged to the raceway 15.

Providing an elastically deformable flange 60 integrally formed with a face plate 45 that is sufficiently rigid to maintain engagement with the raceway 15 can be accomplished by a dual durometer cover 40. The flange 60 preferably has an average durometer which is relatively lower than the average durometer of other elements of the cover 40, such as the face plate 45 and/or the first and second portions 50, 55 of the cover 40. It is contemplated that the flanges 60 will be made of a thermoplastic material having a durometer of less than about Shore 80, preferably from about Shore 30 to about Shore 50, and other portions of the cover 40 will preferably be made of a thermoplastic material having a durometer at least about 15 units greater within the range of about Shore 65 to about Shore 95, preferably from about Shore 80 to about Shore 90. All durometer measurements are in accordance with ASTMD 224D Shore A, 15 second delay. The dual durometer covers of this invention can be obtained using methods known in the art, such as co-extrusion processes.

Figure 2:
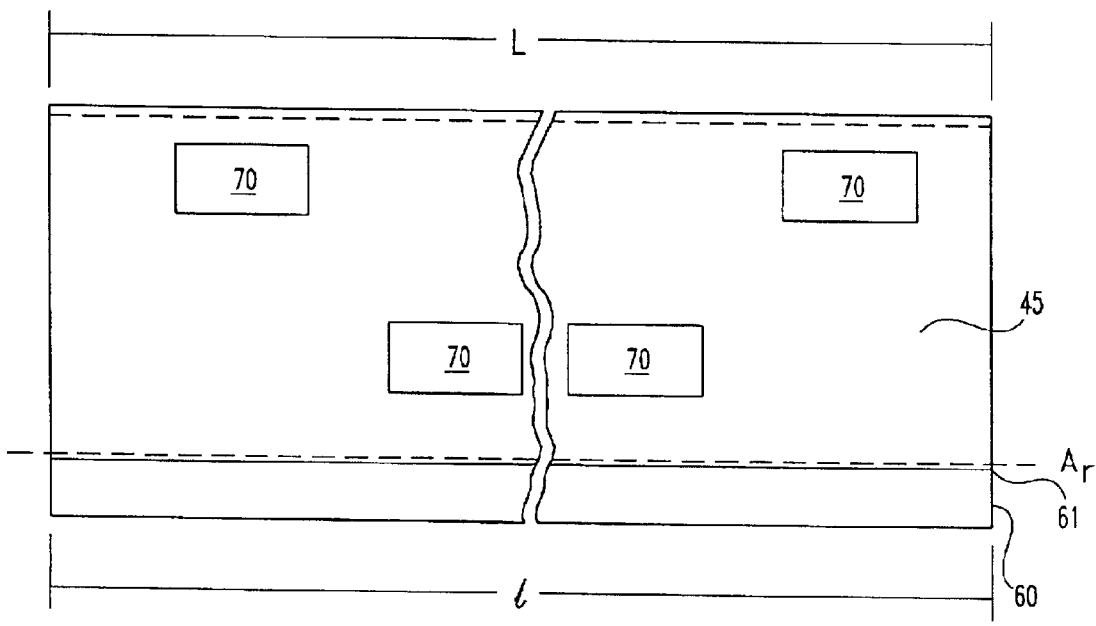
FIG. 2 is a front elevational view of an electrical raceway assembly.

Although a distinct line 61 is shown in FIGS. 1 and 2, between face plate 45 and flange 60, there need not be an exact line between the higher durometer material and the lower durometer material. If thermoplastic materials of different durometers are extruded together as is contemplated in one embodiment of this invention, there will most likely be a fuising of the materials resulting in a certain amount of blending in the zones between the higher and lower durometer thermoplastic materials. The exact position of the line or zone of demarcation between higher and lower durometer material can vary upward or downward along flange 60 so long as the objects of the present invention are achieved. Moreover, the blend lines may be located at different locations on the cover 40 so long as portions of the cover 40 are sufficiently rigid to maintain engagement with the raceway 15. For example, FIG. 7 shows blend lines 53, 58 within the first portion 50' and the second portion 55' of the cover 40' so that the attachment means, such as the rounded edge 56', are relatively rigid while the flange 60' is relatively flexible.

The covers of the present invention may be formed of any suitable material that accomplishes the features of this invention. Preferably, the covers are composed of a thermoplastic material, including synthetic and natural rubbers, plastics and the like. The particular material of the covers is not critical so long as the covers have portions that are sufficiently rigid to maintain snap fit engagement with the raceway until a removal force is applied, and the flange 60 is elastically deformable to allow temporary access to an area behind the flange and then return to an undeformed state occluding the area.

Figure 7:
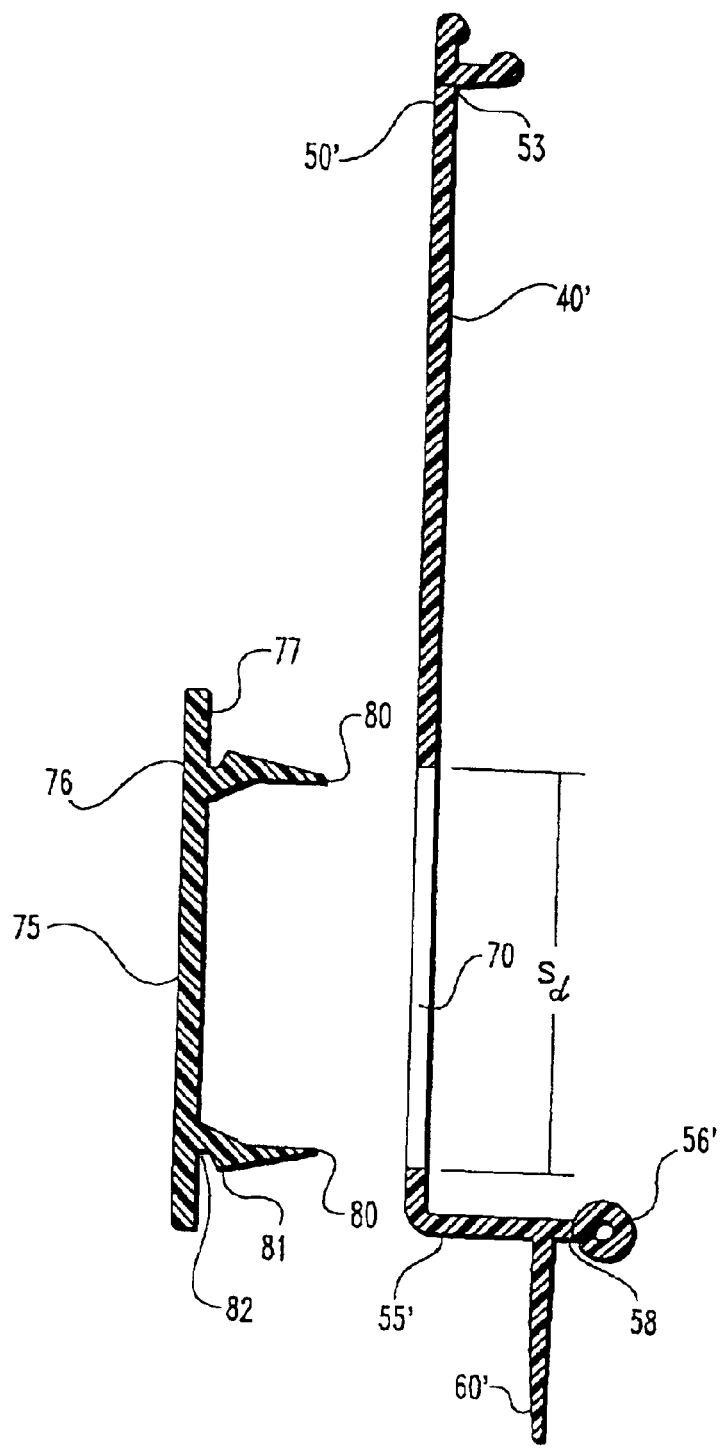
FIG. 7 is a side sectional view of a cover of this invention.
Figure 8:
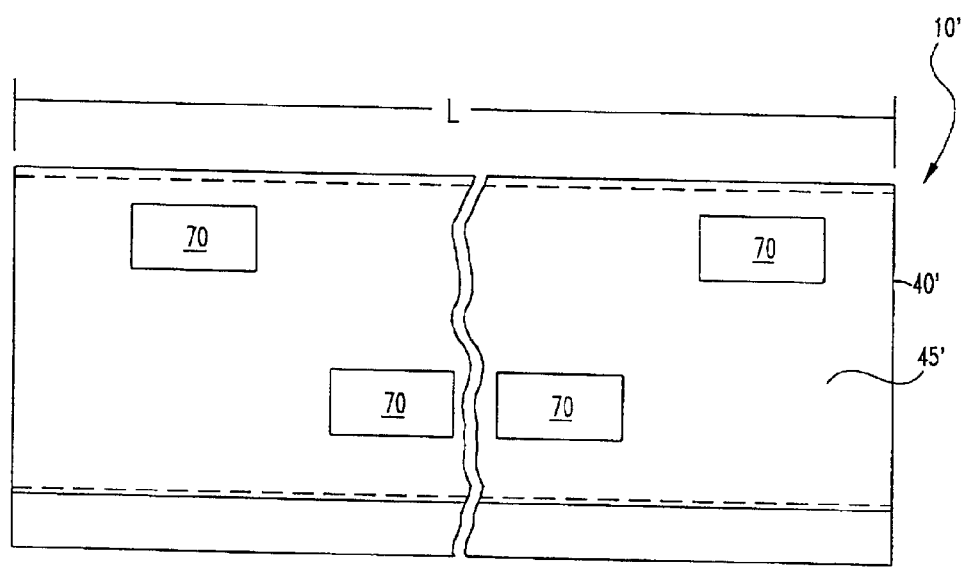
FIG. 8 is a front elevational view of an electrical raceway assembly.
Figure 9:
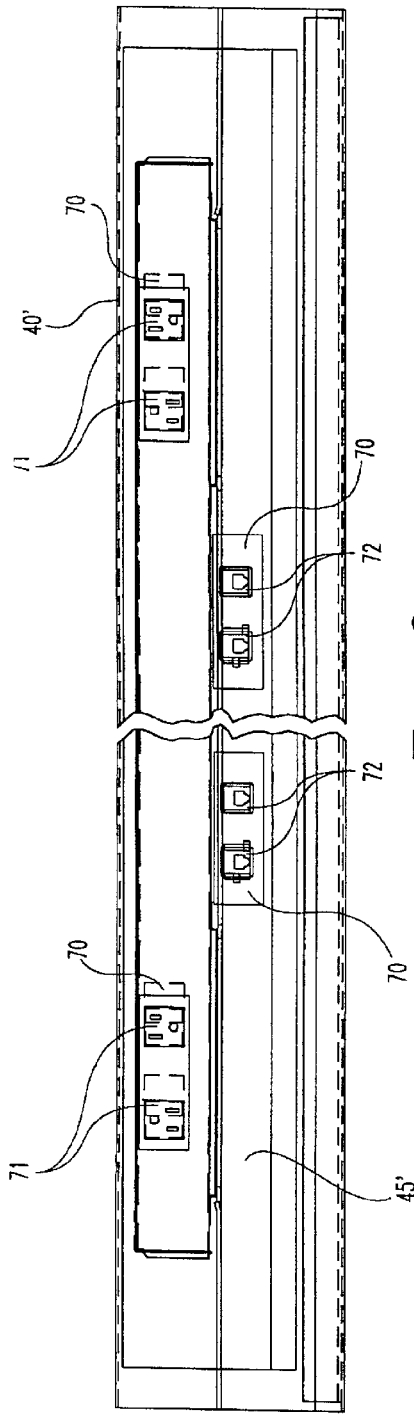
FIG. 9 is a front elevational view of an assembly according to one embodiment of this invention.

Referring now to FIGS. 7–9, in some embodiments, the face plate 45' of the cover 40' defines an access doorway 70 for accessing wires W, electrical outlets 71 and data jacks 72 disposed in the channel of the raceway. Preferably, the assembly 10' also includes a door 75 detachably attachable to the face plate 45' to occlude the doorway 70. The door 75 includes front face 76 and a back face 77 so that the back face 77 faces the channel 30 when the door 75 is attached to the doorway 70.

The assembly 10' preferably includes attachment means for detachably attaching the door 75 to the face plate 45'. In the embodiment shown in FIG. 7, the attachment means includes a pair of oppositely spaced latch members 80 projecting outwardly from the back face 77. In this embodiment, the latch members 80 are perpendicular to a plane of the door 75. Each of the latch members 80 has a shoulder portion 81 facing the back face 77 and a groove 82 between the back face 77 and the shoulder portion 81.

Figure 10:
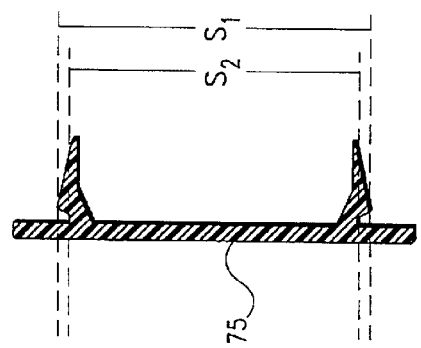
FIG. 10 is a side sectional view of a door for a face plate access doorway according to one embodiment of the present invention.

Referring now to FIGS. 7 and 10, the latch members 80 are configured for snap fit engagement within the doorway 70. Each pair of shoulder portions 81 together defines a first dimension $S_1$ that is larger than a second dimension $S_2$ formed between each pair of grooves 82. The first dimension $S_1$ is larger than a length $S_d$ of the doorway 70 and the second dimension $S_2$ is slightly smaller than the length $S_d$ of the doorway 70 so that the door 75 is snap fittable within the doorway 70 to occlude the doorway 70.

Preferably, there is a difference in rigidity between the latch members 80 and the face plate 45' to allow the shoulder portions 81 to be forced past the smaller dimensioned doorway 70. In one embodiment, the face plate 45' is relatively more flexible than the latch members 80. This may be accomplished by using materials having characteristics that influence rigidity such as thickness and durometer. For example, the face plate 45' may have an average durometer that is relatively lower than the average durometer of the door 75.

In this embodiment, the door 75 is substantially or nearly flush to the face plate 45 so that the assembly 10' has a smooth and streamlined appearance, which does not detract from the overall aesthetics and appearance of the work space. At the same time, each of the doors 75 can be can be opened as desired to provide convenient access to portions of the raceway channel 30' so as to permit access to power blocks or communication cables therein.

Figure 11:
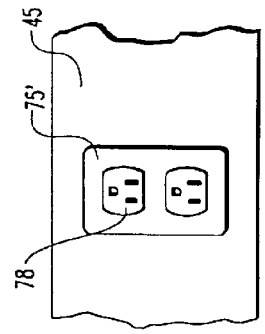
FIG. 11 is a partial front elevational view of a cover and door according to one embodiment of this invention.

In some embodiments as shown in FIG. 11, door 75' may be provided with additional features, such as electrical outlets 78, six-pin telephone jacks, eight-pin keyed telephone jacks, BNC coaxial data connectors, dual-coaxial connectors, TNC coaxial data connectors, subminiature D 25-pin data connectors for twisted pair or ribbon cable, connectors for fiber optic cables and the like.

Figure 12:
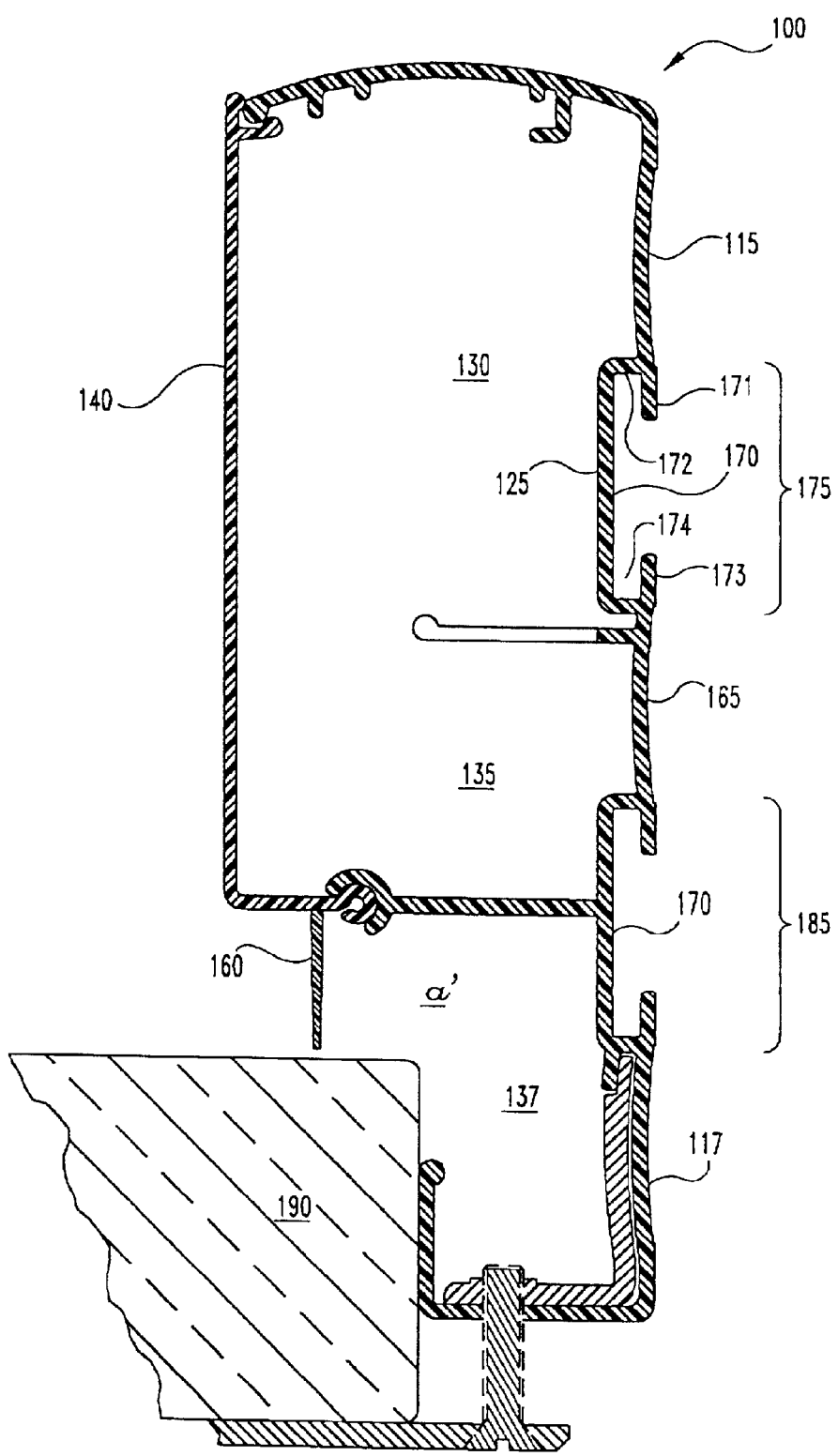
FIG. 12 is a side sectional view of an electrical raceway assembly according to one embodiment of this invention.
Figure 13:
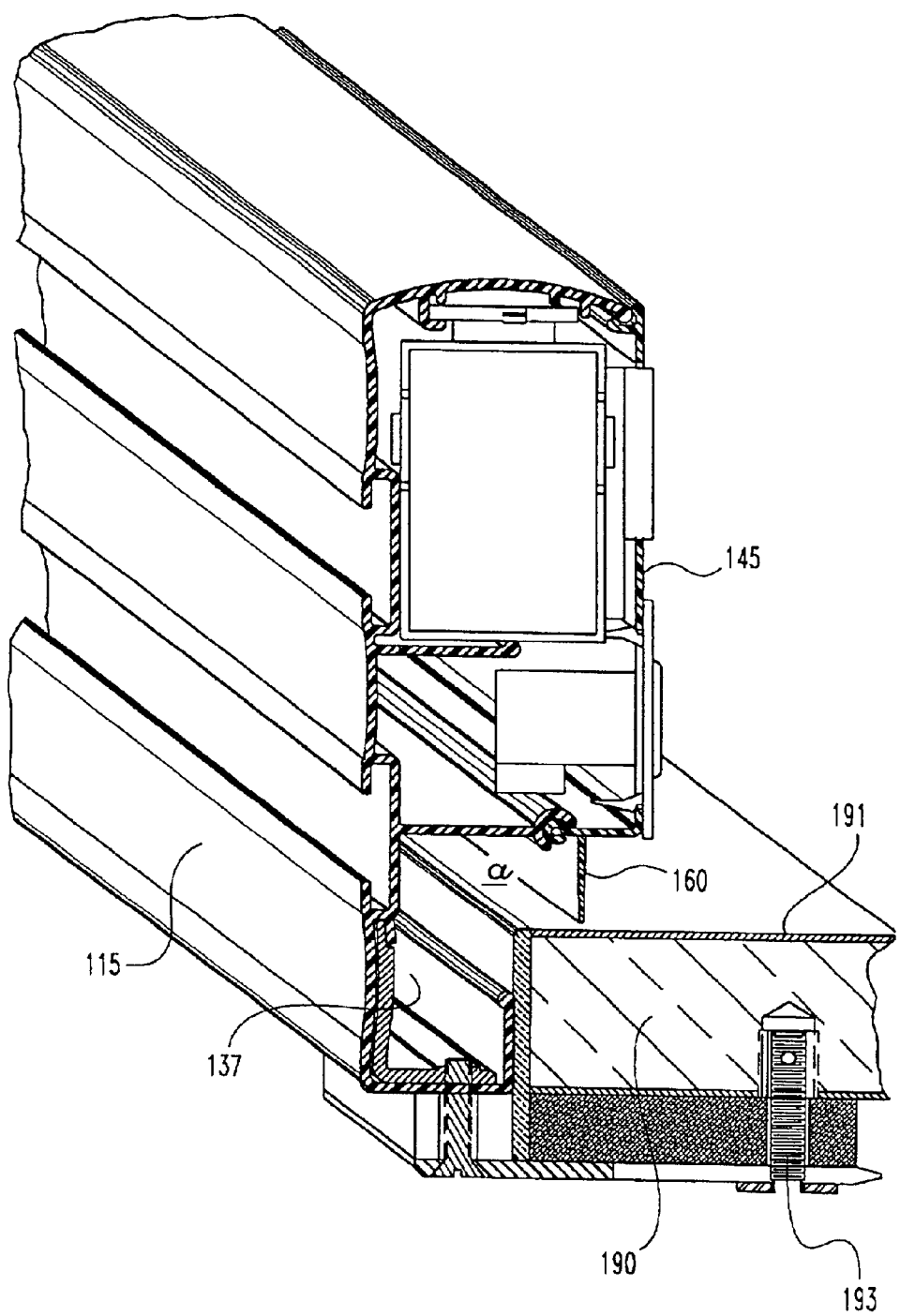
FIG. 13 is a partial sectional view of an assembly of this invention engaged to the top of a structure.

In preferred embodiments, the raceway 115 defines at least one other channel 135 in addition to the first channel 130 as shown in FIG. 12. In some cases it is desirable to house electrical wires in one channel and communication wires in another. In this assembly 100, the raceway 115, also includes an open track channel 137 that defines an area a'. Area a' is partially occluded by flange 160 when the cover 140 is attached to the raceway 115. In this preferred embodiment, the flange 160 contacts or approaches the surface 191 of the structure, such as a desk or table 190 as depicted in FIG. 13. The flange 160 provides a visible seal between the face plate 145 and the surface 191 yet allows access to the open channel 137 to store cords from tools, such as a computer or phone, on the table 190. The open channel 137 can also be used as an additional guide for wires and cords to desk top tools.

Figure 14:
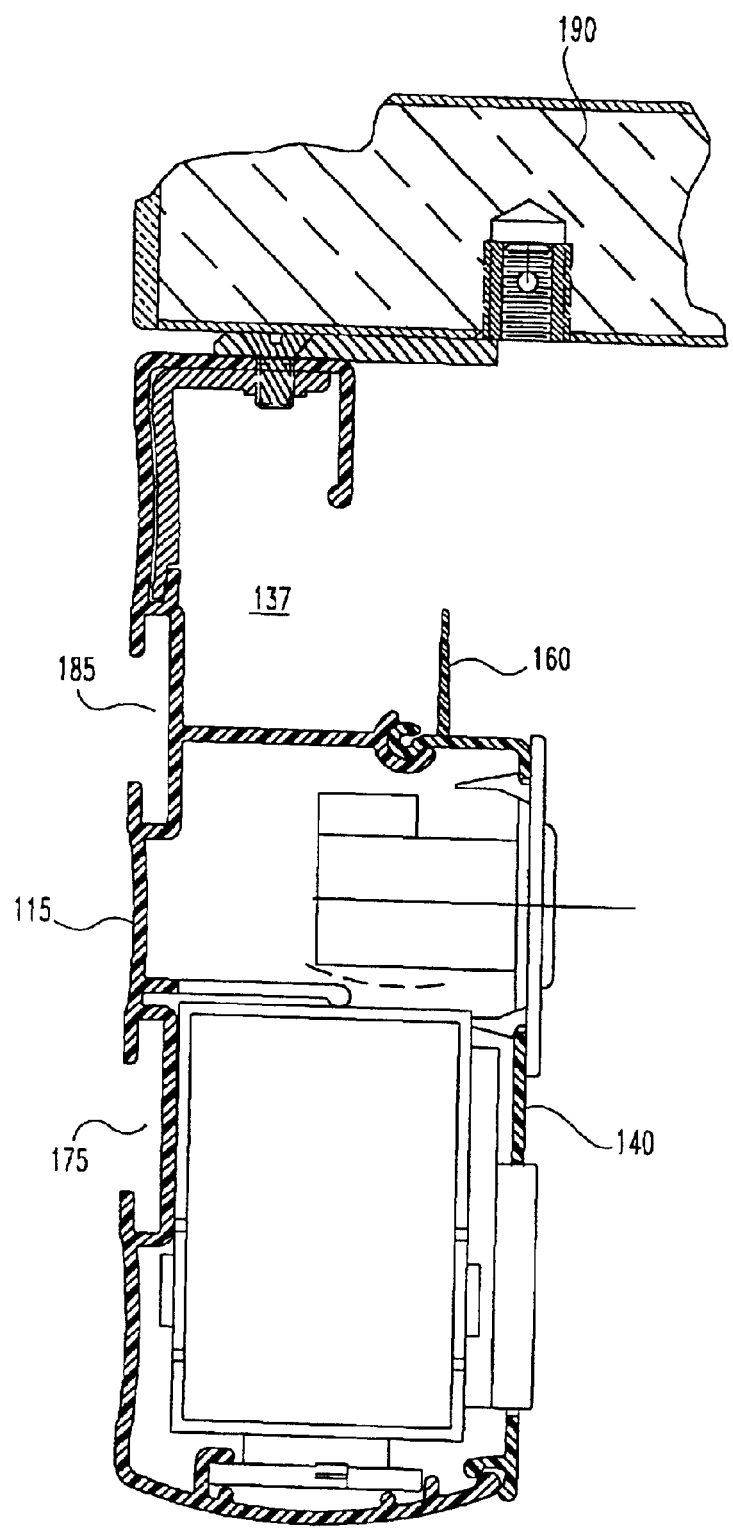
FIG. 14 is a partial sectional view of an assembly of this invention engaged to the underside of a structure.
Figure 15:
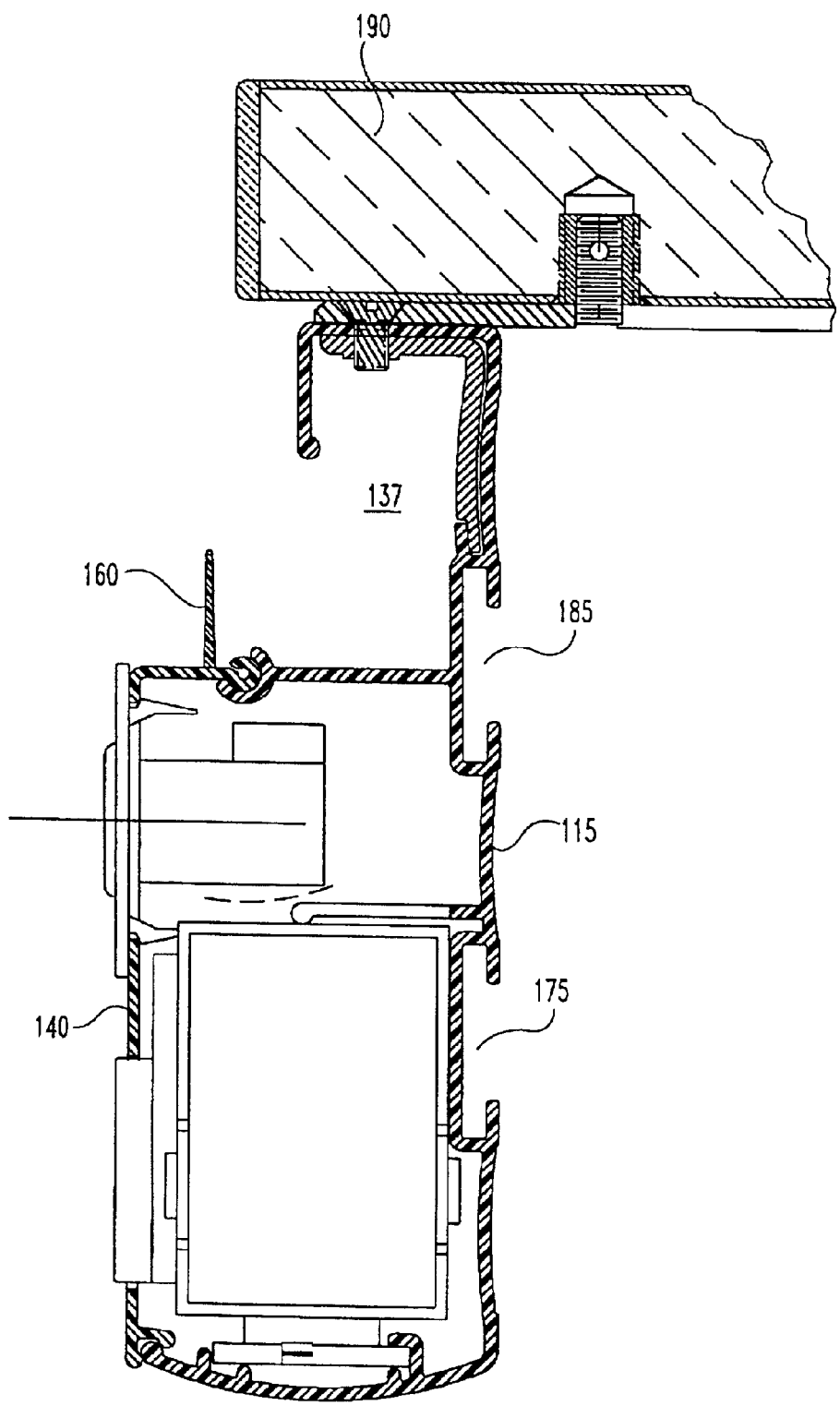
FIG. 15 is a partial sectional view of an assembly of this invention engaged to the underside of a structure.

As shown in FIG. 13, raceway 115 is fastened to the surface 191 of a desk, wall, baseboard, or other suitable structure with a suitable fastener 193. In this embodiment, the raceway 115 and cover 140 form a back panel to the structure 190. The assemblies of this invention may also be fastened below the structure 190 to serve as a modesty panel as shown in FIGS. 14 and 15. In FIG. 14, the open channel 137 is exposed to the area beneath the structure 190. This configuration is useful in structures defining grommets (not shown) through the surface for wires to extend from the open channel 137, through the grommet to the surface 191 of the structure 190. In FIG. 15, the open channel 137 is open behind the structure 190. This configuration can be used to deliver wires from the open channel 137 to the back of the structure 190 and onto the surface 191. In embodiments similar to those shown in FIGS. 14 and 15, it may be desirable to lengthen the flange 160 to further occlude the open channel 137 yet still allow access. In still other embodiments, the assembly 100 can be incorporated into other structures, such as a wall panel. The flange 160 can be positioned to contact or approach the floor for capturing excess cords.

Figure 16:
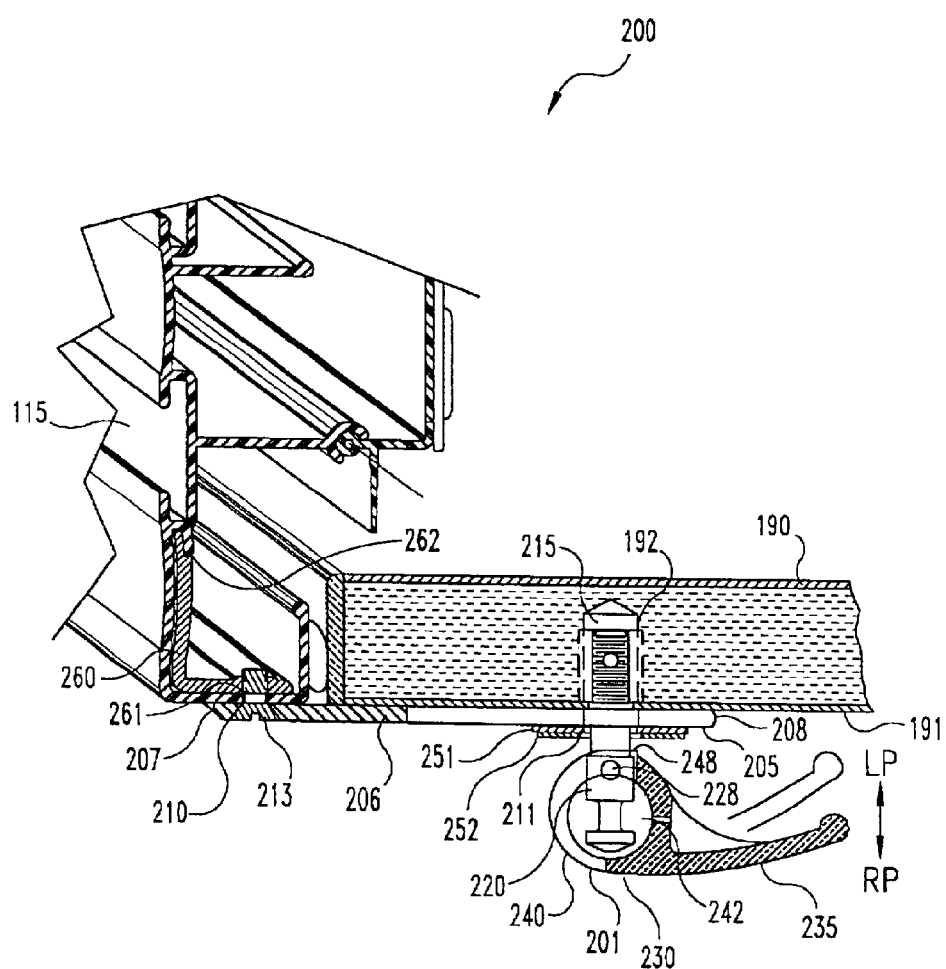
FIG. 16 is a side sectional view of a raceway assembly of this invention.
Figure 17:
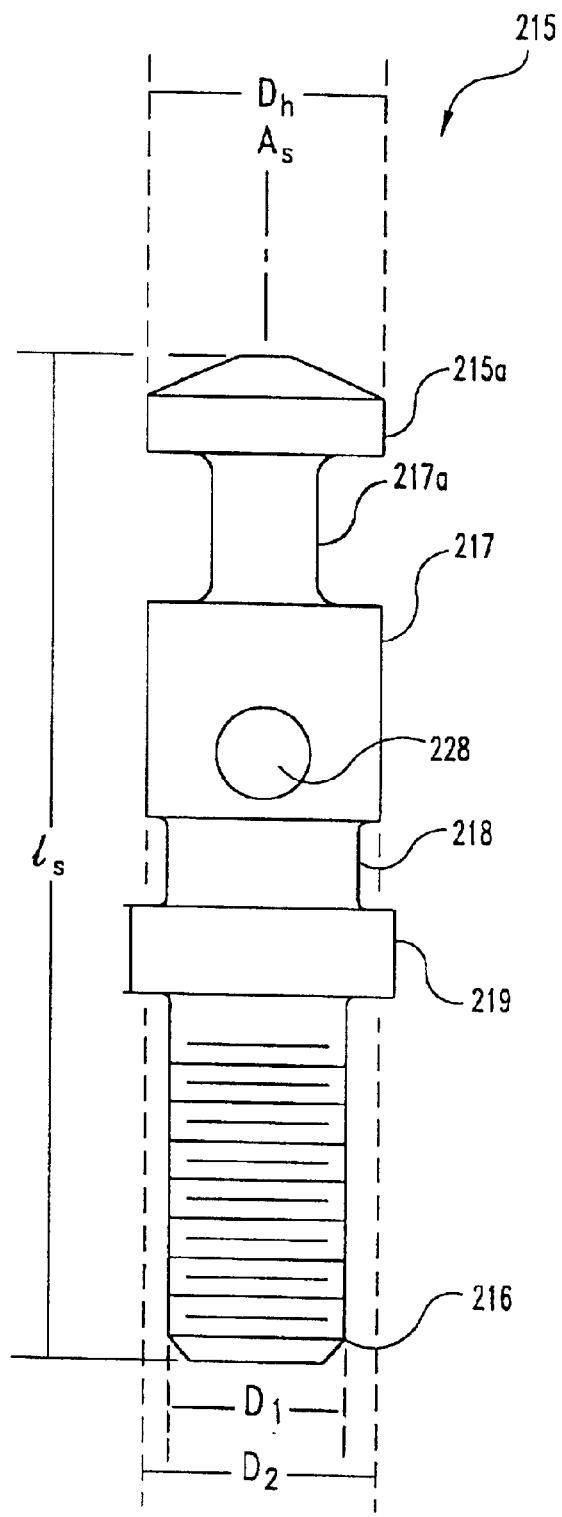
FIG. 17 is a side elevational view of a stud according to this invention.

A preferred fastener for securing the raceways of this invention to a structure is depicted in FIGS. 16 and 17. In this embodiment 200, the fastener is a locking element 201 that securely and detachably engages the raceway 115 to the structure 190 in any configuration such as the ones shown in FIGS. 13–15. The locking element 201 includes an attachment element 205, a stud, core and a locking lever.

In a preferred embodiment, the attachment element 205 includes a mounting plate 206 having a first end 207 attachable to the raceway 115. As shown in FIG. 16, the first end 207 defines an aperture 210 for receiving a bolt 213. The second end 208 of the mounting plate 206 also defines an opening 211. The opening 211 can be in the form of a slot open at the second end 208 to facilitate and guide placement of the mounting plate 206 under the table and aligned with the locking element 201.

Figure 18:
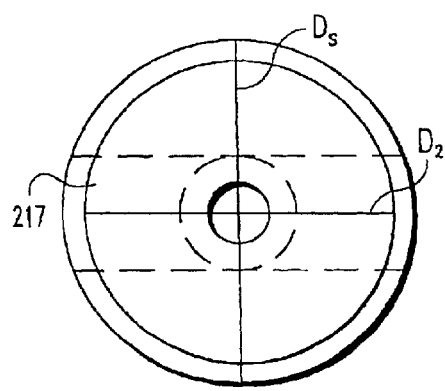
FIG. 18 is an elevational view of the stud of FIG. 17.

The locking element 201 also includes a stud 215 more clearly shown in FIGS. 17 and 18. The stud 215 defines a first axis A, along a length $l_s$ of the stud 215 and has a threaded first end 216, an opposite second end 217 and a shoulder 219 between the first end 216 and the second end 217. The first end 216 is insertable through the opening 211 of the mounting plate 206 to engage a threaded hole 192 in the surface 191 of the structure 190. The stud 215 is embedded within the structure 190 and projects outwardly at a right angle to the surface 191. The shoulder 219 has an outer diameter $D_s$ greater than an outer diameter $D_1$ of the first end 216 and an outer diameter $D_2$ of the second end 217. The shoulder 219 establishes the depth of penetration of the stud 215 into the structure 190. The shoulder 219 is insertable into the opening 211 of the mounting plate 206 when the first end 216 is threadably engaged to the threaded hole 211. Preferably, the diameter $D_s$ of the shoulder 219 is just slightly less than the width of the slot aperture 211 in plate 206 so the shoulder 219 fits snugly within the slot and prevents lateral movement of the plate 206 relative to the stud 215. As shown in FIG. 16, the shoulder 219 has a height less than the thickness of the plate 206.

Figure 19:
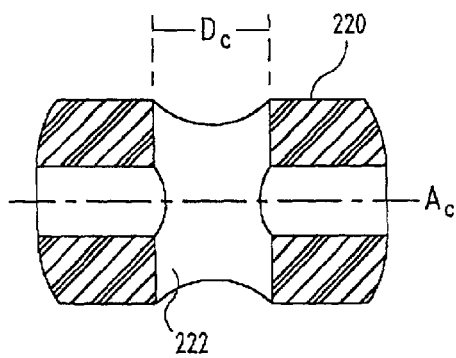
FIG. 19 is a side sectional view of a core according to this invention.
Figure 20:
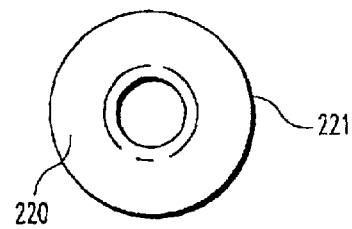
FIG. 20 is a top elevational view of the core of FIG. 19.
Figure 21:
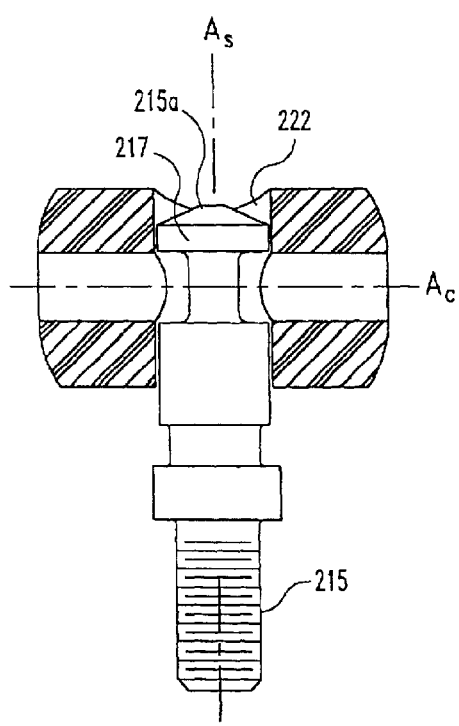
FIG. 21 is a side sectional view of a stud within a core.

The locking element 201 also includes a core 220 more clearly shown in FIGS. 19 and 20. The core 220 has a rounded outer surface 221 and defines a thru-hole 222 for receiving the second end 217 of the stud 215 as depicted in FIG. 21. The core 220 also defines a second axis A, perpendicular to said first axis $A_s$. Preferably, the second end 217 of the stud 215 terminates in a head 215a having a diameter $D_h$ slightly smaller than a diameter $D_c$ of the thru-hole 222 of the core 220.

Figure 22:
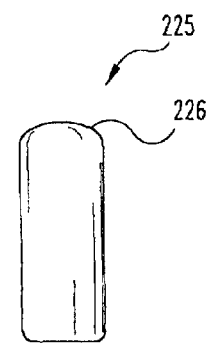
FIG. 22 is a side elevational view of a pin.
Figure 23A:
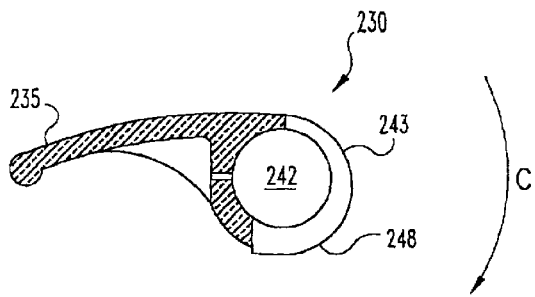
FIG. 23A is a side sectional view of a locking lever.
Figure 24:
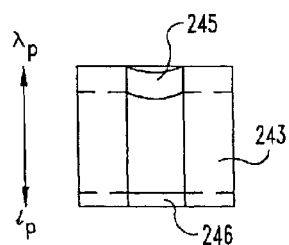
FIG. 24 is a top elevational view of the locking lever shown in FIG. 23.
Figure 23:
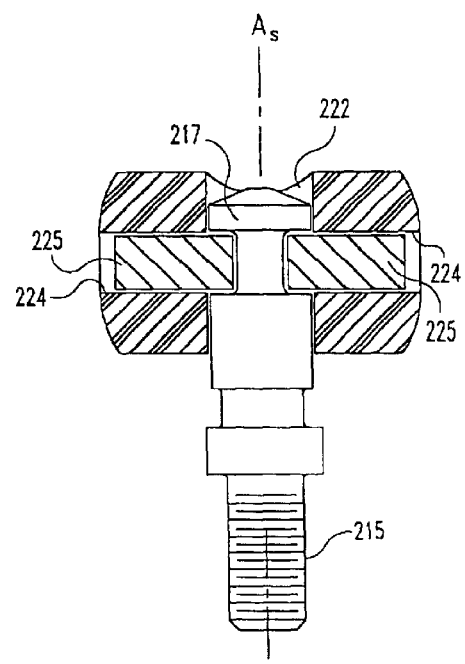
FIG. 23 is a side sectional view of a stud engaged to a core.
Figure 25:
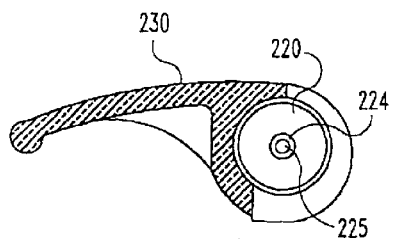
FIG. 25 is a side sectional view of a core engaged to a locking lever.

Means are provided for fixing the second end 217 within the thru-hole 222. In one embodiment, the means include a pin hole 224 defined in the core 220 and a pin 225 insertable into the pin hole 224 for engaging the second end 217 of the stud 215. Preferably, each pin 225 has a rounded end 226 for gripping the stud 215 as shown in FIG. 22. As shown in FIGS. 17 and 23, the second end 217 of the stud 215 defines a reduced diameter neck 217a adjacent the head 215a. The neck 217a is configured for receiving the pins to facilitate fixing the stud 215 within the core 220.

Referring now to FIGS. 16 and 23–25, the locking element 201 includes a locking lever 230 having a handle portion 235 and a rounded camming portion 240. The camming portion 240 includes a chamber 242 defined in part by a wall 243 for rotatably housing the core. The wall 243 defines a groove 245 therethrough in communication with the chamber 242 for receiving the second end 217 of the stud 215 when the stud 215 is engaged to the core 220 and the core 220 is housed in the chamber 242. The wall defines a contoured camming surface 248 surrounding one end 246 of the groove 245. Following along arrow C in FIG. 23, the wall 243 becomes progressively thicker to form the camming surface 248.

As shown most clearly in FIG. 16, the locking lever 230 is rotatable about the second axis $A_c$ of the core 220 from a first released position RP to a second locked position LP with the camming surface 248 bearing against the mounting plate 206 to securely engage the raceway 215 to the structure 190. In other words, the wall 243 becomes progressively thicker to form the camming surface 248 as the stud 215 moves from one end rp of the camming portion 240 to the camming end lp as shown in the end view of the lever 230, FIG. 24.

Figure 26:
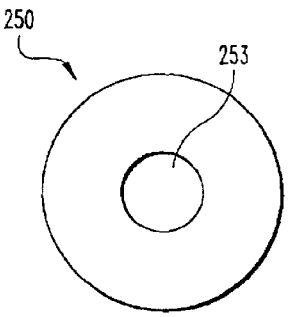
FIG. 26 is a top elevational view of a washer according to this invention.
Figure 27:
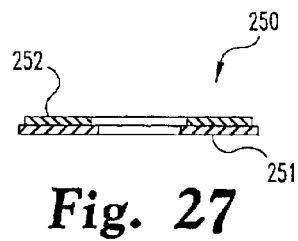
FIG. 27 is a side sectional view of the washer shown in FIG. 26.
Figure 30:
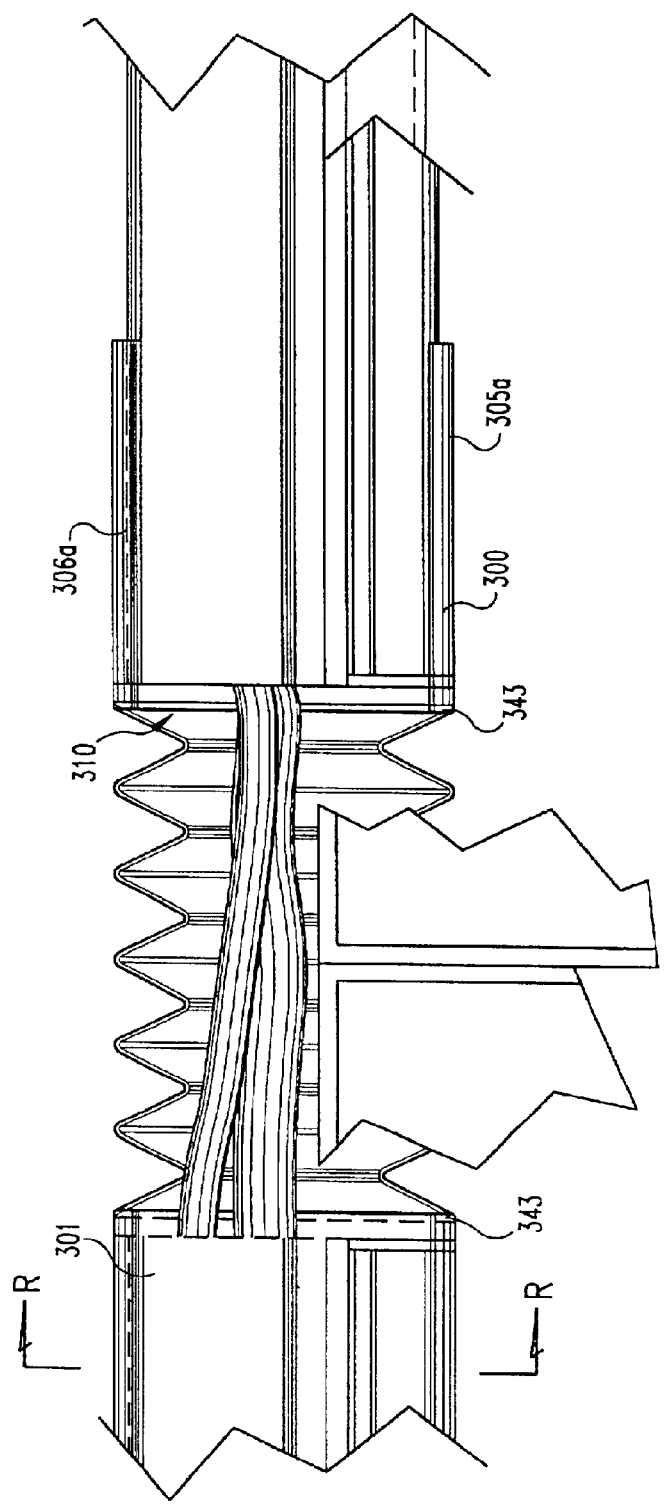
FIG. 30 is bottom elevational view of the boot raceway assembly shown in FIG. 29.
Figure 31:
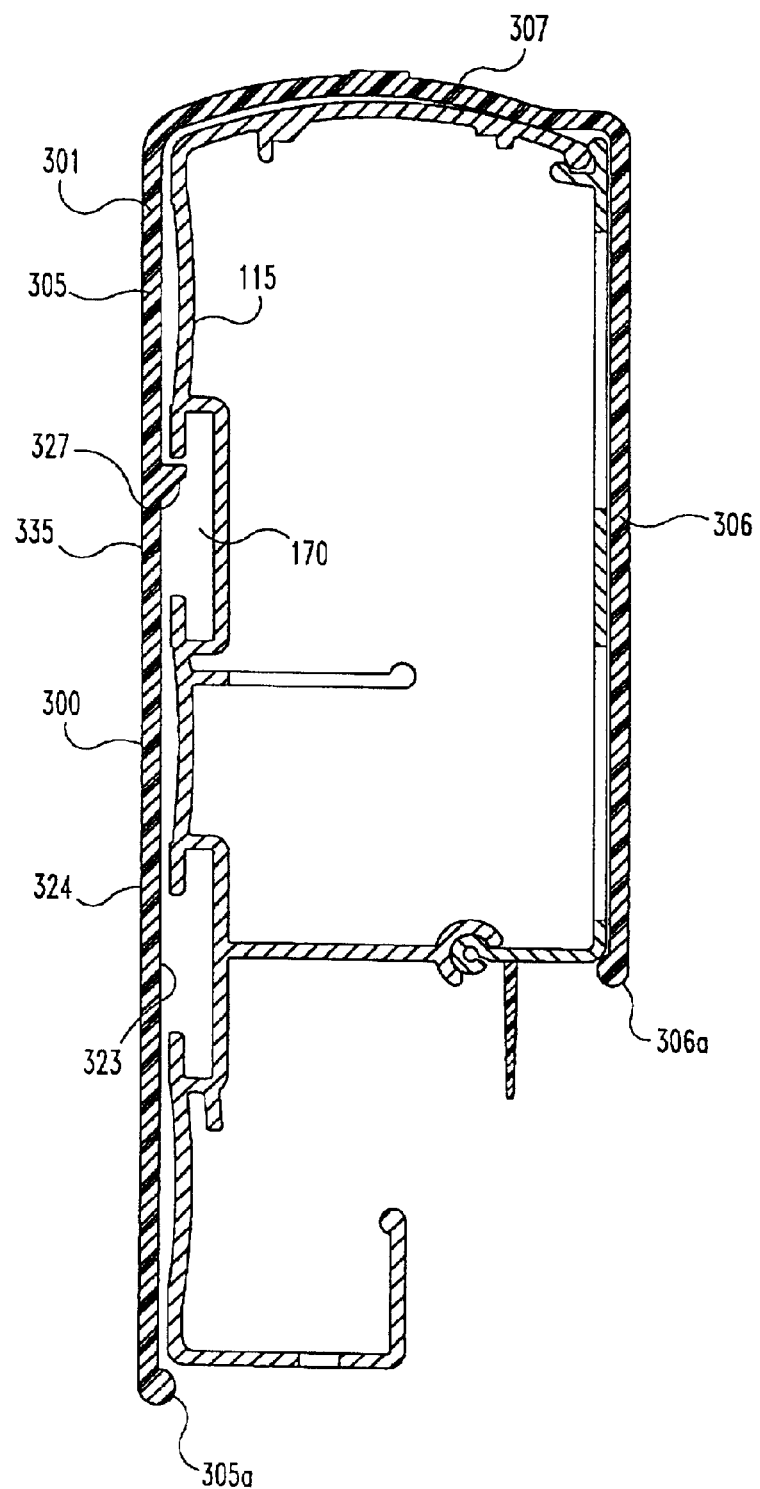
FIG. 31 is a side sectional view of the boot raceway assembly shown in FIG. 29 taken along lines 31—31.

Preferably, the invention also includes a washer 250 mountable on the second end 217 of the stud 215 as shown in FIGS. 16, 26 and 27. The washer 250 has a first surface 251 for interfacing with the mounting plate 206 and a second surface 252 for interfacing with the camming surface 248 when the camming surface 248 bears down on the plate 206. The washer 250 defines a hole 253 for receiving the stud 215. Preferably, washer 250 is laminated and the first surface 251 is an elastic material, such as rubber, serving as a high friction surface against the plate 206. The second surface 252 is a relatively more rigid material, such as steel or another metal. The second surface 252 provides a wear surface for repeated passage of the camming surface 248. The washer 250 spreads the clamping force generated by the locking lever 230 over a greater area of the plate 206 to greatly enhance the frictional fixation.

Preferably, as shown in FIG. 17, the stud 215 defines a reduced diameter portion 218 adjacent the shoulder 219 for seating the washer 250. Due to the natural flow characteristics of rubber, the first portion 251 will tend to have a slightly greater outer diameter and lesser inner diameter than the second surface 252. Because of this the washer 250 will grip the second portion 217 of the stud 215 during assembly but will swivel freely upon reaching the reduced diameter portion 218 where it will operate.

Preferably, as shown in FIGS. 16 and 17, stud 215 defines a cross hole 228 for receiving a tool for installation and removal of the locking element 201. A tool may be inserted through the cross hole 228 and a rotational force imparted to unscrew the first end 216 of the stud 215 from the structure 190. The particular structure of the features of the locking element 201 may vary. For example, FIG. 28 depicts a stud 215' that has an elongated shoulder 219'. This embodiment is useful for thicker structures.

Also, in preferred embodiments, the assembly also includes an angle iron as depicted in FIG. 16. The angle iron 260 is matingly disposed within one of the channels 137 along its length. Angle iron 260 defines a bolt hole 261 corresponding to the aperture 210 in the mounting plate 206. The angle iron 260 is held in position within the channel 130 by a lip 262. The angle iron 260 provides additional rigidity to the extruded raceway 115 to resist bending moments at the engagement of the plate 206 to the raceway 115.

It is understood that the attachment element 205 provides means to quickly attach or remove a raceway 115 from a structure, such as a table. A number of such elements 205 can be spaced along the length of the raceway 115 as necessary to support the raceway 115 and associated electrical elements. The attachment element, and particularly the mounting plate 206, permits supporting the raceway 115 projecting above the table as shown in FIG. 13 or below the table as shown in FIG. 15.

The present invention also provides devices for bridging a pair of electrical raceways. A preferred embodiment is depicted in FIGS. 29–32. Boot 300 includes an elongated tubular member 301 that has a semi-U shaped cross-section most clearly depicted in FIG. 33. The tubular member 301 includes a pair of facing walls 305, 306 and a third wall 307 connecting the facing walls 305, 306 to define a tunnel 310 along a length $l_b$ of the member 301. The member 301 defines a tunnel mouth 312 along the length of the member 301 in communication with the tunnel 310. Both of the facing walls 305, 306 preferably terminate in a rounded edge 305a, 306a.

The member 301 includes a first end 320 defining a first opening 321 in communication with the tunnel 310. The first end 320 has an inner surface 323, an outer surface 324 and a first gripping member 325 for gripping an end of a raceway 115. The member 301 includes a second opposite end 330 defining a second opening 331 in communication with the tunnel 310. The second end 330 has an inner surface 333, an outer surface 334 and a second gripping member 335 for gripping an end 121 of a second raceway 120. A relatively more flexible midsection 340 is disposed between the first and second ends 320, 330. The midsection is bendible to assume various configurations. In a preferred embodiment, the midsection 340 is folded accordion-style to form corrugations 342, which enhance the flexibility of the midsection 340. The midsection 340 can assume angles up to about 90° as shown in FIG. 29.

The boot 300 also includes attachment means for attaching the first end 320 of the tubular member 301 to one of the raceways 115 and the second end 330 of the member 301 to the other raceway 120. In some embodiments, the attachment means includes an attachment projection 327 on the inner surface 323 of the first end 320 and a similar attachment projection (not shown) for the second end 330. The attachment projections 327 are configured to engage a recess 170 defined in the corresponding raceway 115, 120. Preferably, the projections 327 are adjacent the third wall 307.

The projection 327 addresses one challenge in creating a bridging member for a pair of raceways. The bridging member must firmly grip the ends of the raceways yet the bridging member must provide flexibility in the length and angles between the raceways. The gripping power of a channel-like enclosure is a function of the cube of the length to the point of gripping. If the enclosure gripped the raceway 115 at the edges 305a, 306a, the sides would have to be nearly 20 times stiffer than is necessary in this invention due to the projection 327. Therefore, the stiffness requirements of ends 320, 330 would make manufacturing of the flexible midsection between the two ends 320, 330 difficult. According to the present invention, a gripping projection 327 is provided near the base or third wall 307 of the enclosure. This provides a highly efficient method of gripping because the gripping point is near the base and therefore, this allows ends 320, 330 of a more flexible material.

The boots 300 of this invention are composed of any suitable material. In some embodiments, a dual durometer boot 300 is provided, in which the ends 320, 330 are composed of a material having an average durometer relatively higher than an average durometer of the midsection 340. Preferably, the boot 300 material is a thermoplastic for ease of manufacture, appearance, durability and the other desirable characteristics of those materials. Preferred materials include nylons and polypropylenes.

In some embodiments, an inner flange 343 is provided to increase the rigidity and gripping power of the ends 320, 330. The flanges 343 advantageously resist any reactive spreading forces generated by the corrugations 342 when they are forced into a curved displacement. A flange 343 projects inwardly from the inner surfaces 323, 333 of the boot 300. Preferably a flange 343 is provided at or adjacent each of the ends 320, 330 near the intersection of the end 320, 330 and the flexible section 430.

Figure 34:
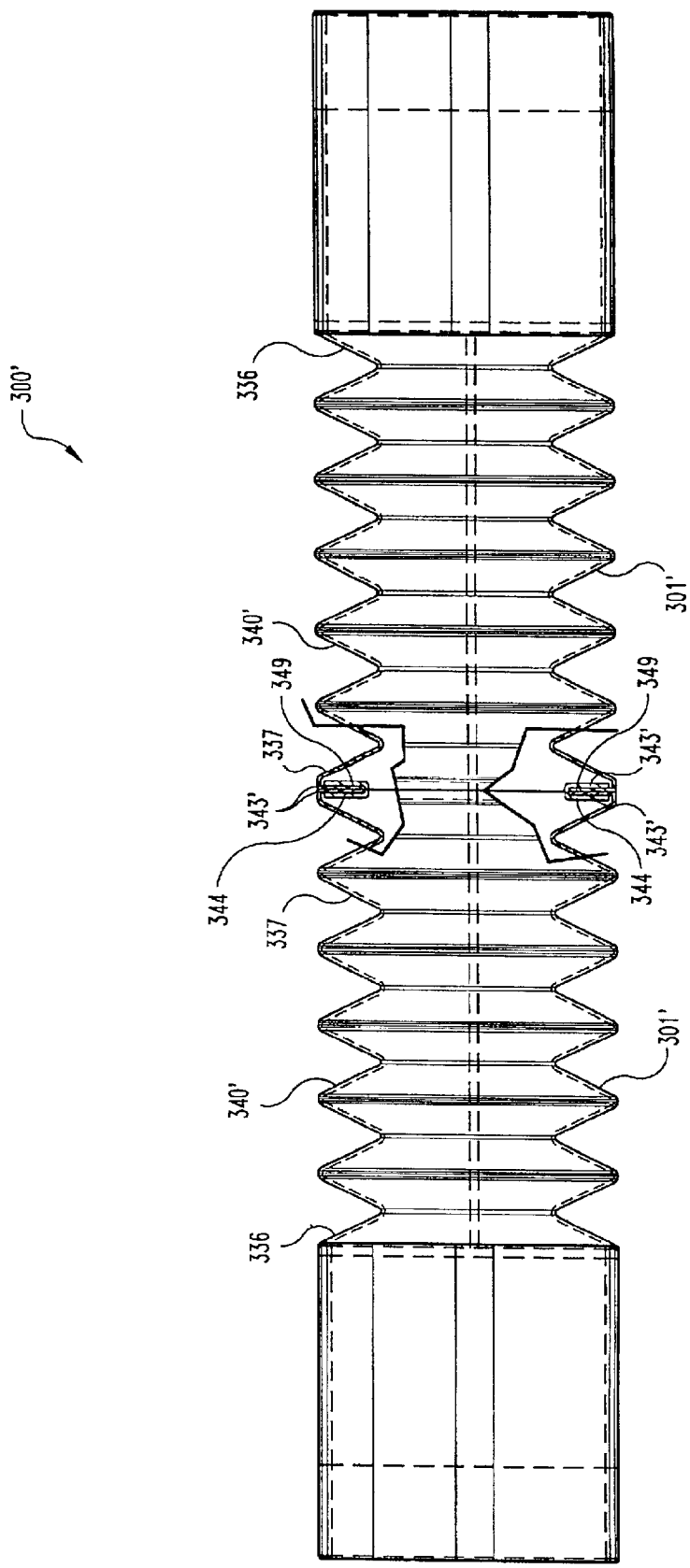
FIG. 34 is a top partial sectional view of another embodiment of a boot raceway assembly.

One advantage of this invention is that it provides flexibility in the angles and lengths between adjacent raceways that are to be electrically connected. In some cases, the raceway bridging device must have an extended length to accommodate the distance between raceways. In such cases, a boot assembly 300' is provided as depicted in FIG. 34.

Figure 35:
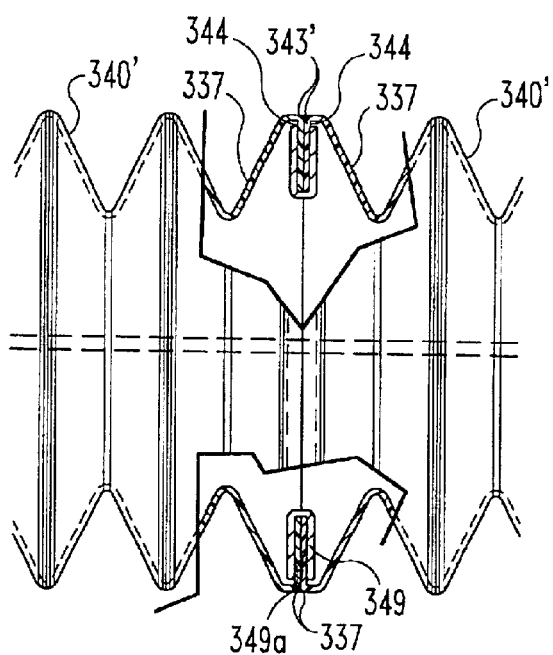
FIG. 35 is a detailed view of the assembly shown in FIG. 34 depicting connection means.

The boot assembly 300' includes a number of boots having a total length sufficient to span the distance between the raceways. Each of the boot sections 300a includes a tubular member 301' having flexible section 340' with a first end 336 and an opposite end 337. Each boot section 300a includes a first gripping portion as described above connected to the first end 336 of the flexible section 340'. The opposite end 337 of each flexible section 340' terminates in an inner flange 343' inwardly projecting from the inner surface 323 of the boot section 300a. The flange 343' has a first surface 344 facing the first end 336 of the boot section 300a and an opposite surface 337 as shown more clearly in FIG. 35.

Figure 36:
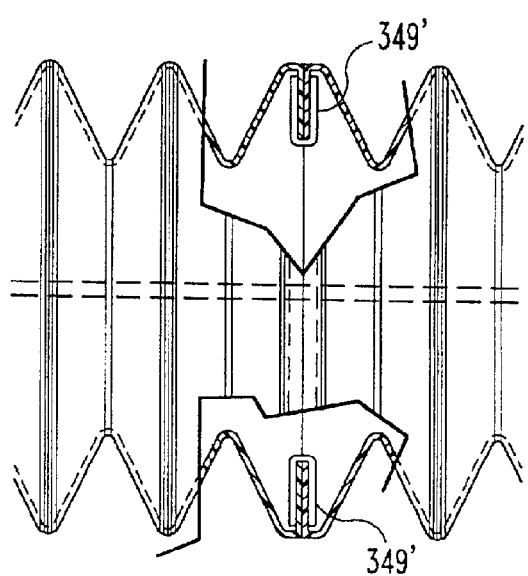
FIG. 36 is a detailed view of another connection means.

The boot assembly 300' also includes connecting means for connecting the opposite ends 340' of the boot sections 300a. In one specific embodiment shown more clearly in FIG. 35, the connecting means includes a circular clip 349 having a U-shaped cross-section for maintaining the outer surfaces 345 of the flanges 343' in pressing engagement. The clip 349 conforms to the inner surface 323 of the tubular member 301. In other embodiments shown in FIG. 36, discrete clipping members 349' are provided at one or more locations along the flanges 343'. In some embodiments, the clip 349 includes an inwardly projecting barb 349a defined on the inner surface of the clip 349 for gripping one of the flanges 340'.

Figure 32:
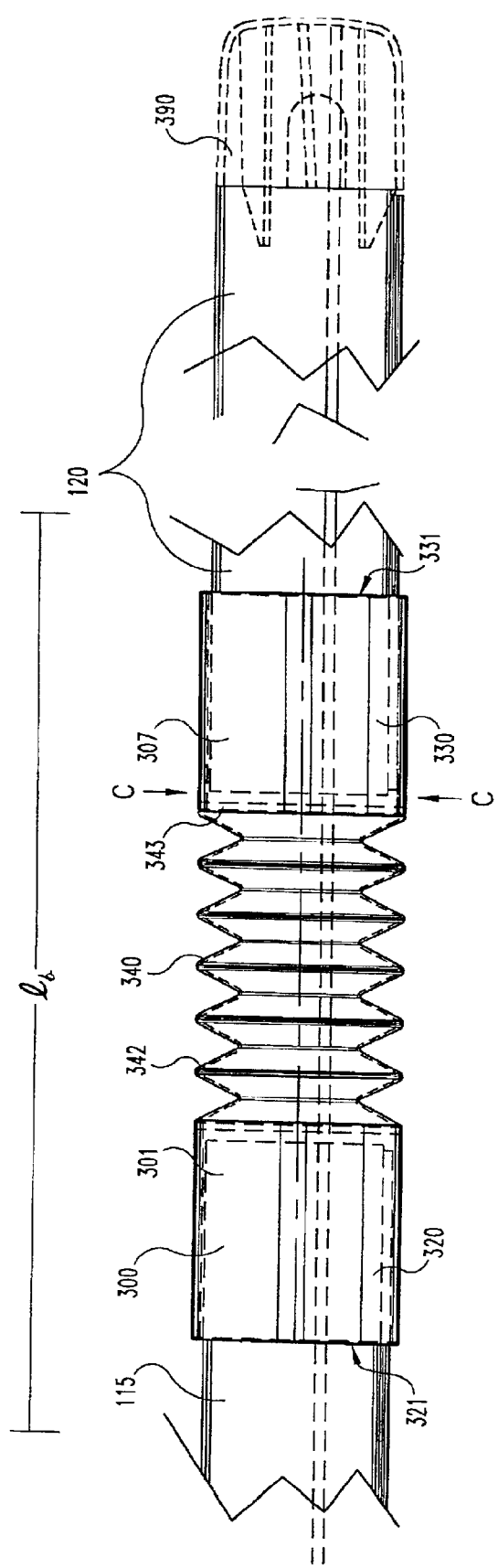
FIG. 32 is a top elevational view of a boot raceway assembly of this invention.
Figure 33:
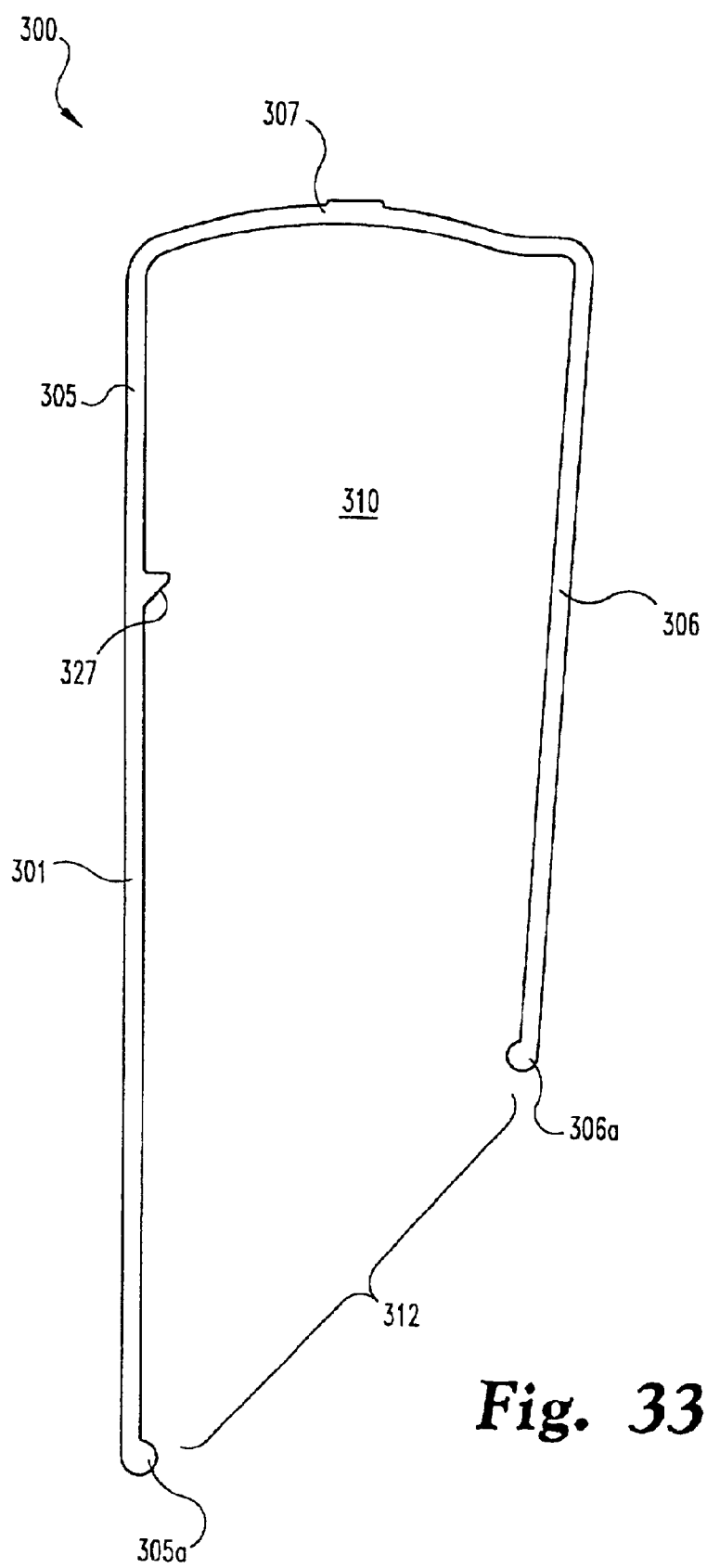
FIG. 33 is a side elevational view of a boot according to this invention.

It will be appreciated that the boot assembly 300' can be provided by modifying a pair of boots such as the one depicted in FIG. 32. Boot 300 can be modified by removing the second end 330 just to the right of the flange 343 at arrow C. Two such modified boot sections can be connected at the work site using the connection means of this invention.

In other embodiments, the invention also includes an end cap 390 for plugging the end of a raceway 115 as depicted in FIG. 32.

The raceways of this invention are preferably formed of a suitable rugged sheet metal material capable of being easily formed and shaped but not readily bent or abused. Any suitable tough, resilient material which possesses form-sustaining rigidity upon being formed and which exhibits sufficient flexibility to provide the connection upon installation as described may be used to form the assembly.

The raceways 115 of this invention are suited for engagement above and below a structure in either a facing or reversed orientation. One of the features of the raceways that allows this versatility is shown in FIGS. 12, 14 and 15. The base wall 117 of the raceway 115 has an interior surface 125, which partially forms the channels 130, 135, 137, and an exterior surface 165. The exterior surface 165 defines an elongate tongue 171 and groove 172 along the length of the raceway 115. The tongue 171 is spaced from the exterior surface 165 and the groove 172 is formed between the tongue 171 and the exterior surface 165. The tongue 171 and groove 172 provide a recess 170 for engaging devices such as the boot 300.

Preferably, the exterior surface 165 also defines a second elongate tongue 173 and groove 174 defined along the length of the exterior surface 165. The second tongue 173 and groove 174 is adjacent the first tongue 171 and groove 172 so that the second groove 174 is contiguous with the first groove 172 to form a groove pair 175 with a substantially C-shaped cross-section. This embodiment allows the raceway 115 to oriented in any direction and still serve as an attachment point for a device such as the boot 300. Preferably, the raceway also includes a second groove pair 185 defined along the exterior surface 165 of the raceway 115 and spaced apart from and substantially parallel to the first groove pair 175.

Figure 37:
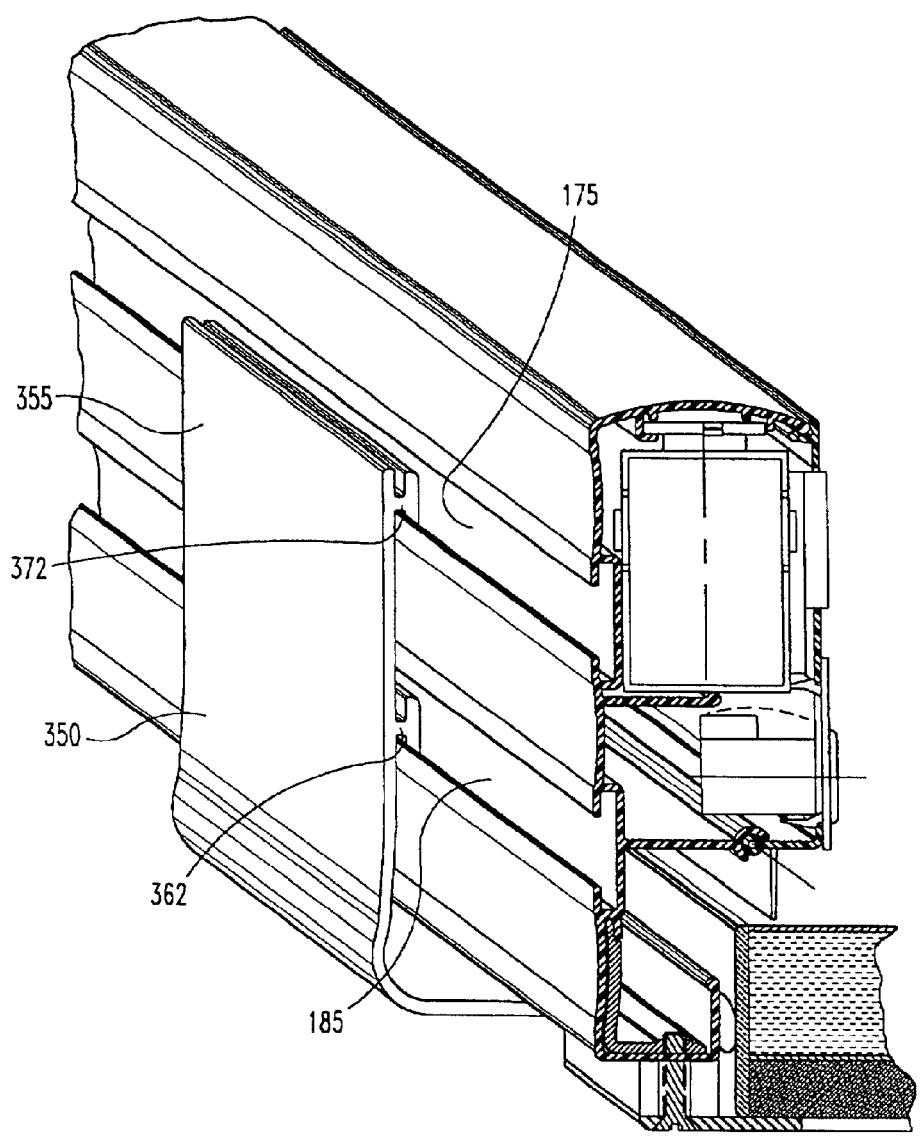
FIG. 37 is a perspective view of a raceway assembly of this invention including a plate engaged to the raceway.
Figure 38:
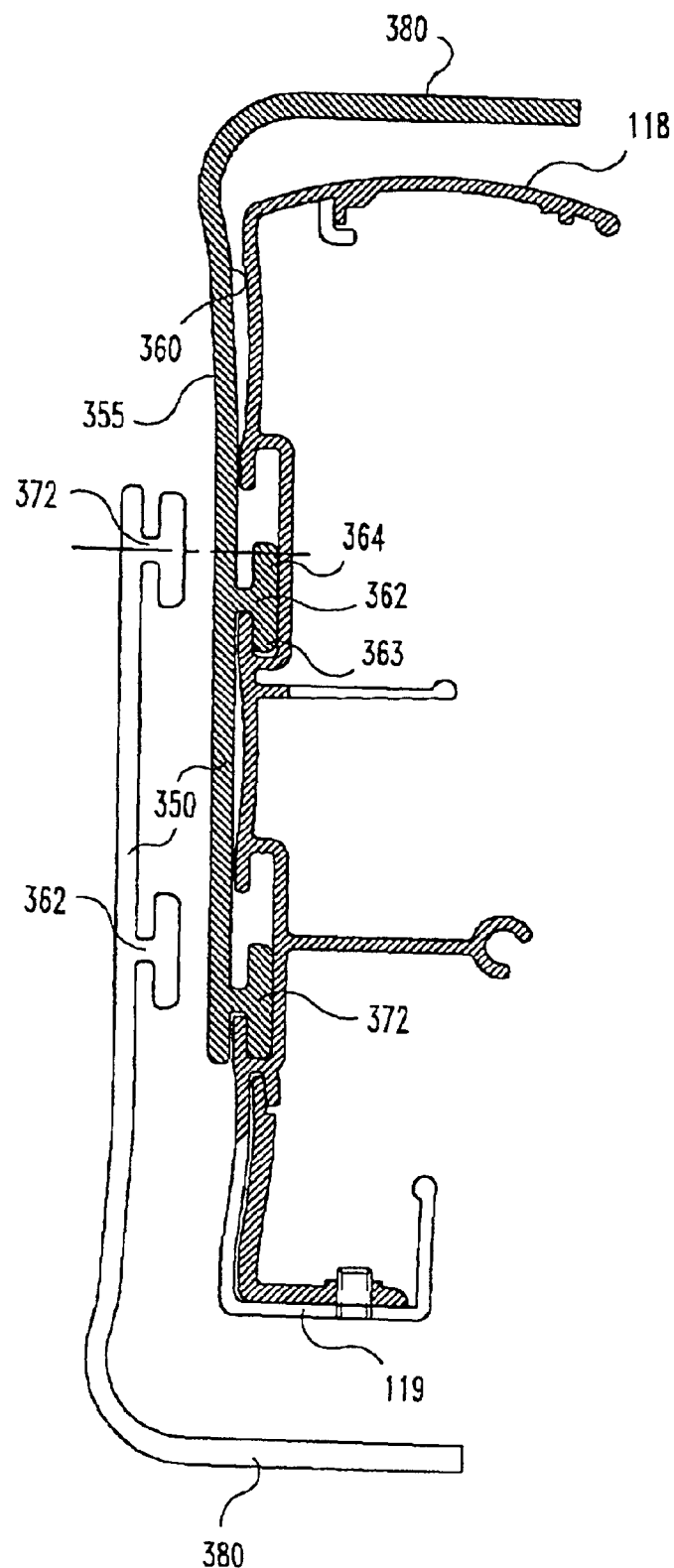
FIG. 38 is a side sectional view of the assembly shown in FIG. 37.
Figure 39:
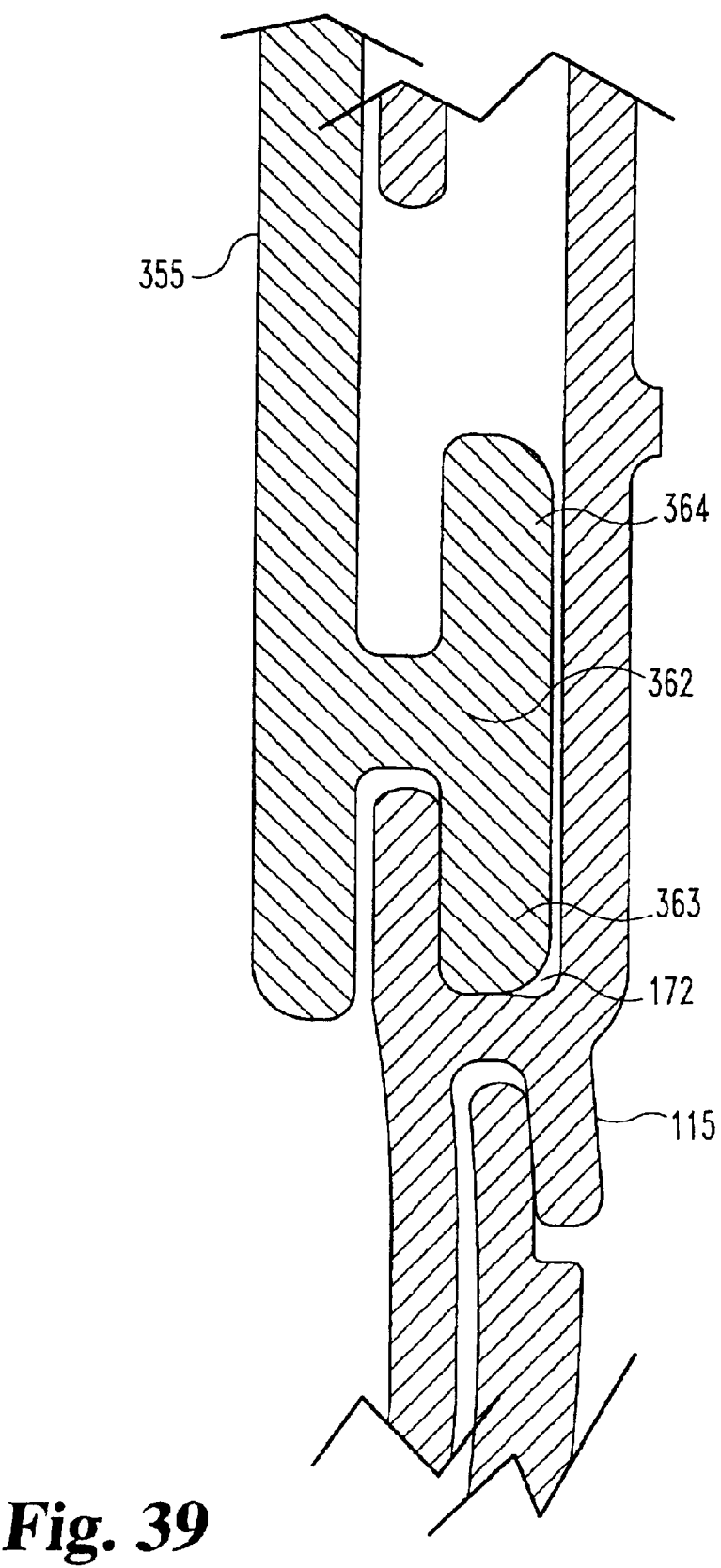
FIG. 39 is a detail of the connection of the plate to the raceway shown in FIG. 38.

The present invention also provides an elongated plate 350 that is engageable to the tongue and groove pairs 175, 185 of the exterior surface 165 as shown in FIGS. 37–39. The plate 350 has a decorative external surface 355 and an internal surface 360. The plate 350 includes at least one elongate rib 362 extending along its length. The rib 362 includes a projection 363 receivable within one of the grooves 172, 174 of the raceway 115 in cooperative interlocking engagement as most clearly shown in FIG. 38. Preferably, the rib 362 includes a second projection 364 extending oppositely from the first projection 363 so that the rib 362 has a T-shaped cross-section. Most preferably, the internal surface 360 of the plate 350 includes a second rib 372 spaced apart from the first rib 362 so that the ribs 362, 372 are each alternately receivable in one of the grooves 172, 174 as shown in FIG. 38. In one embodiment, the plate 350 is curved to form a canopy portion 380 extendable over one of the sidewalls 118, 119 of the raceway 115 when the plate 350 is engaged to the exterior surface 165. In the preferred embodiment, the ribs are each receivable in either of the groove pairs so the plate 350 can be attached to the raceway 115 with the canopy 380 curved over either sidewall 118, 119 as shown in FIG. 38.

The present invention economically and conveniently provides accommodations for electronic equipment in work spaces, which enhance the utility of office structures. The raceway assemblies of this invention guide wires to their outlets and provide table top access to power supply and communication ports. Conveniently, the raceway assemblies of this invention can be engaged above or below structures, facing forward or behind the structures. The devices of the present invention enhance the utility of office structures in an aesthetically pleasing manner and improve the quality of the work environment.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed:

1. A workplace structure assembly for use with a table top structure having an upper and a lower surface comprising:
    an elongated raceway detachably engageable to a surface of the structure and having a length, a transverse base and a pair of opposite upstanding sidewalls extending along said length to define at least one open channel configured for retaining electrical wires, said raceway configured to be alternatively engageable in one of two positions, said two positions including a first position wherein said raceway extends above the upper surface and a second position wherein said raceway extends beneath the lower surface; and
    a locking element for detachably engaging said raceway to said surface of the structure.

2. The assembly of claim 1 wherein said raceway is further configured to be alternatively engageable in one of two orientations, said two orientations including a forward facing orientation and a reversed orientation wherein said open channel is exposable to an area behind the structure.

3. The assembly of claim 1 wherein said locking element includes a first end detachably engaged to said raceway, and an opposite second end having a locking lever, said locking lever movable between a locked position for quickly engaging said raceway to the structure and a released position for quickly releasing said raceway from the structure.

4. A workplace structure assembly for use with a table top structure having an upper and a lower surface comprising:
    a mounting plate having a first end and defining a slot at an opposite end, said mounting plate having a pair of opposite surfaces;
    an elongated raceway engaged to the first end of the mounting plate and having a length, a transverse base and a pair of opposite upstanding sidewalls extending along said length to define at least one open channel configured for retaining electrical wires,
    said elongated raceway alternatively engageable to either of the pair of opposite surfaces of said mounting plate when one of said opposite surfaces is engaged to the lower surface of the structure to engage said raceway in one of two positions, said two positions including a first position wherein said raceway extends above the upper surface and a second position wherein said raceway extends beneath the lower surface; and
    a locking element engagable to said slot for detachably engaging said mounting plate to the the lower surface of the structure.

5. The assembly of claim 4 wherein said locking element includes a locking lever, said locking lever movable between a locked position for quickly engaging said raceway to the structure and a released position for quickly releasing said raceway from the structure.

6. The assembly of claim 5 wherein:
    said locking element further includes:
        a stud defining a first axis along a length of said stud and having a threaded first end, an opposite second end and a shoulder between said first end and said second end, said first end insertable through said slot to engage a threaded hole in the surface of the structure, and said shoulder sized to fit snugly within said slot, and a core having a rounded outer surface and defining a thru-hole for receiving said second end of said stud and means for fixing said second end within said thru-hole, said core defining a second axis perpendicular to said first axis; and wherein said locking lever has a handle portion and a rounded camming portion, said camming portion including:

a chamber for rotatably housing said core, a wall defining a groove therethrough in communication with said chamber for receiving said second end of said stud when said stud is engaged to said core and said core is housed in said chamber, said wall defining a contoured camming surface surrounding one end of said groove;

whereby said locking lever is rotatable about said second axis of said core between said released position to said locked position with the camming surface bearing against one of said pair of said opposite surfaces of said mounting plate to securely engage said raceway to the structure.

* * * * *

UNITED STATES PATENT AND TRADEMARK OFFICE
CERTIFICATE OF CORRECTION

PATENT NO. : 6,792,877 B2  Page 1 of 1
APPLICATION NO. : 09/843216
DATED : September 21, 2004
INVENTOR(S) : Gutgsell et al.

It is certified that error appears in the above-identified patent and that said Letters Patent is hereby corrected as shown below:

Col. 9, line 41 [A] should be --As--

Col. 9, line 65 [A] should be --Ac--

Signed and Sealed this

Eighth Day of January, 2008

JON W. DUDAS
*Director of the United States Patent and Trademark Office*

UNITED STATES PATENT AND TRADEMARK OFFICE
CERTIFICATE OF CORRECTION

PATENT NO. : 6,792,877 B2  
APPLICATION NO. : 09/843216  
DATED : September 21, 2004  
INVENTOR(S) : Gutgsell et al.

Page 1 of 1

It is certified that error appears in the above-identified patent and that said Letters Patent is hereby corrected as shown below:

Col. 9, line 41 "A" should be --As--

Col. 9, line 65 "A" should be --Ac--

Signed and Sealed this

Twenty-ninth Day of January, 2008

JON W. DUDAS  
*Director of the United States Patent and Trademark Office*